United States Patent
Kanzaki et al.

(10) Patent No.: US 11,094,938 B2
(45) Date of Patent: Aug. 17, 2021

(54) AQUEOUS SECONDARY BATTERY

(71) Applicants: MITANI BATTERY CO., LTD., Osaka (JP); UNIVERSITY PUBLIC CORPORATION OSAKA, Osaka (JP)

(72) Inventors: Yuki Kanzaki, Osaka (JP); Kazunobu Sato, Osaka (JP); Takeji Takui, Osaka (JP); Daisuke Shiomi, Osaka (JP); Satoshi Mitani, Osaka (JP)

(73) Assignees: MITANI BATTERY CO., LTD., Osaka (JP); UNIVERSITY PUBLIC CORPORATION OSAKA, Osaka (JP)

( * ) Notice: Subject to any disclaimer, the term of this patent is extended or adjusted under 35 U.S.C. 154(b) by 190 days.

(21) Appl. No.: 16/090,099

(22) PCT Filed: Mar. 30, 2017

(86) PCT No.: PCT/JP2017/013420
§ 371 (c)(1),
(2) Date: Sep. 28, 2018

(87) PCT Pub. No.: WO2017/170944
PCT Pub. Date: Oct. 5, 2017

(65) Prior Publication Data
US 2019/0097231 A1    Mar. 28, 2019

(30) Foreign Application Priority Data
Mar. 31, 2016 (JP) .............. JP2016-071009

(51) Int. Cl.
*H01M 4/60* (2006.01)
*H01M 10/36* (2010.01)

(52) U.S. Cl.
CPC ............. *H01M 4/60* (2013.01); *H01M 4/608* (2013.01); *H01M 10/36* (2013.01); *H01M 2300/0002* (2013.01)

(58) Field of Classification Search
CPC ........ H01M 4/60; H01M 4/608; H01M 10/36; H01M 2300/0002
See application file for complete search history.

(56) References Cited

U.S. PATENT DOCUMENTS

| | | | | |
|---|---|---|---|---|
| 2014/0308581 | A1* | 10/2014 | Yao | H01M 4/606 429/213 |
| 2015/0295229 | A1 | 10/2015 | Rosciano et al. | |
| 2017/0229738 | A1* | 8/2017 | Yao | H01M 10/0568 |

FOREIGN PATENT DOCUMENTS

| JP | 2002117830 | A | 4/2002 |
|---|---|---|---|
| JP | 2005150410 | * | 6/2005 |

(Continued)

OTHER PUBLICATIONS

Yang et al. Chem. Commun., 2015, 51, 5097 (Year: 2015).*

(Continued)

*Primary Examiner* — Lisa S Park
(74) *Attorney, Agent, or Firm* — Lewis Roca Rothgerber Christie LLP

(57) ABSTRACT

The object of the present invention is to provide an electric power storage device using an aqueous electrolytic solution that is safe even if the device is damaged while being used and the electrolytic solution leaks out from the battery housing. Specifically, the object of the present invention is to provide a secondary battery having both excellent safety and excellent cycle characteristics. The present invention is an aqueous secondary battery, wherein at least either of the positive electrode or the negative electrode comprises a compound (I) having a naphthalenediimide structure or a perylenediimide structure as an active material.

4 Claims, 8 Drawing Sheets

(56) References Cited

FOREIGN PATENT DOCUMENTS

| JP | 2012248478 A | 12/2012 |
| JP | 2013048012 A | 3/2013 |
| JP | 2015536365 A | 12/2015 |
| WO | WO2007146453 A2 | 12/2007 |
| WO | WO2011068217 A1 | 6/2011 |
| WO | WO2012121445 A1 | 9/2012 |
| WO | WO2013157458 A1 | 10/2013 |
| WO | WO2014169122 A1 | 10/2014 |
| WO | WO2016024594 A1 | 2/2016 |
| WO | WO2016025467 A1 | 2/2016 |

OTHER PUBLICATIONS

International Search Report issued in PCT/JP2017/013420, dated Jul. 4, 2017 with English Translation, 4 pages.
Extended European Search Report dated Oct. 2, 2019, issued in corresponding EP Application No. 17775478.5, 10 pages.
McAdam, C. John, et al., "N-Ferrocenyl Naphthalimides: Synthesis, Structure, and Redox Chemisty", Organometallics, vol. 19, No. 18, pp. 3644-3653 (2000).
Nakatsuji, Shin'ichi, et al., "Spin-Carrying Naphthalenediimide and Perylenediimide Derivatives", Bull. Chem. Soc. Jpn., vol. 83, No. 9, pp. 1079-1085 (2010).

* cited by examiner

AQUEOUS SECONDARY BATTERY

CROSS-REFERENCE TO RELATED APPLICATION(S)

This application is a National Phase Patent Application and claims priority to and the benefit of International Application Number PCT/JP2017/013420, filed on Mar. 30, 2017, which claims priority to and the benefit of Japanese Patent Application Number 2016-071009, filed Mar. 31, 2016, the entire contents of all of which are incorporated herein by reference.

FIELD OF THE INVENTION

The present invention relates to an aqueous secondary battery.

BACKGROUND ART

In recent years, as a power source for IT devices, such as mobile phones, laptop computers, and electric vehicles, electric power storage devices, such as secondary batteries and hybrid capacitors, have been widely used. As electric power storage devices, lithium-ion secondary batteries are widely used since they have excellent battery characteristics, such as electromotive force, energy density, and charge/discharge energy efficiency, and demonstrate less self-discharging. To enable these lithium-ion secondary batteries to be charged and discharged at a high voltage, for example, a non-aqueous electrolytic solution containing an organic solvent is used as an electrolytic solution. Furthermore lithium transition metal oxide is used in either of the positive electrode and the negative electrode.

In order to improve the battery characteristics, materials used for lithium-ion secondary batteries are being studied. Patent document 1 discloses a technique of using an organic compound with a naphthalenediimide structure as the electrode active material of a lithium-ion secondary battery of a coin form. With respect to lithium-ion secondary batteries, by using an organic compound with a naphthalenediimide structure as an electrode active material, there can be obtained a secondary battery which has high energy density and output and demonstrates relatively low reduction of capacity even when charging and discharging are repeated.

PRIOR ART REFERENCE

Patent Document

Patent document 1: International Patent Publication No. 2012/121145

SUMMARY OF THE INVENTION

Problems to be Solved by the Invention

However, electrolytic solutions containing an organic solvent used in lithium-ion secondary batteries are combustible and harmful to the human body. Furthermore, lithium-ion secondary batteries have a disadvantage in that they are dangerous to the user if they are damaged while being used and the electrolytic solution leaks out from the battery housing. Furthermore, lithium-ion secondary batteries using an imide compound as the electrode active material have a disadvantage in that their cycle characteristics are not satisfactory.

Accordingly, the object of the present invention is to provide an electric power storage device using an aqueous electrolytic solution that is safe even if it is damaged while being used and the electrolytic solution leaks out from the battery housing. Specifically, the object of the present invention is to provide a secondary battery with both excellent safety and excellent cycle characteristics.

Means for Solving the Problems

The present inventors have conducted extensive studies with a view toward solving the above-mentioned problems. As a result, it has been found that, when a secondary battery comprises a compound with a naphthalenediimide structure or a perylenediimide structure as the electrode active material and has an aqueous electrolytic solution as the electrolytic solution, the secondary battery is safe, has improved stability when charged or discharged, and has excellent cycle characteristics. Specifically, the gist of the present invention for solving the above-mentioned problems is as described below.

[1] An aqueous secondary battery, wherein at least either of a positive electrode or a negative electrode comprises compound (I) with a naphthalenediimide structure or a perylenediimide structure as an active material.

[2] The aqueous secondary battery according to item [1], wherein compound (I) is a compound represented by the following formula (1) or (2), or a polymer with structural units represented by the following formula (3) or (4):

[Chemical formula 1]

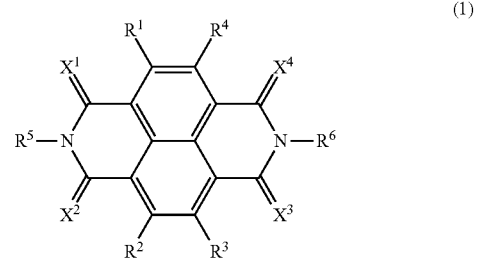

(1)

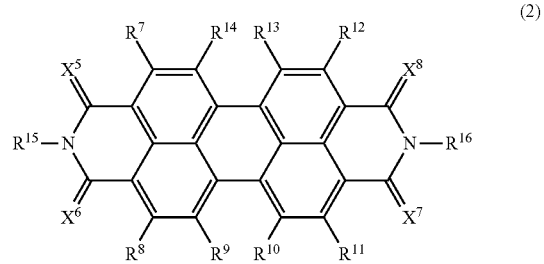

(2)

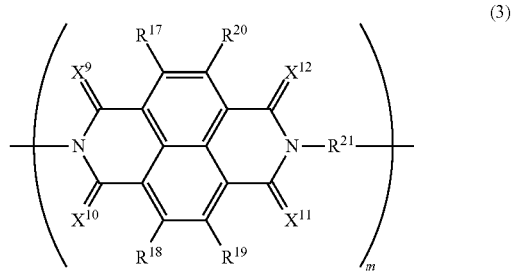

(3)

-continued (4)

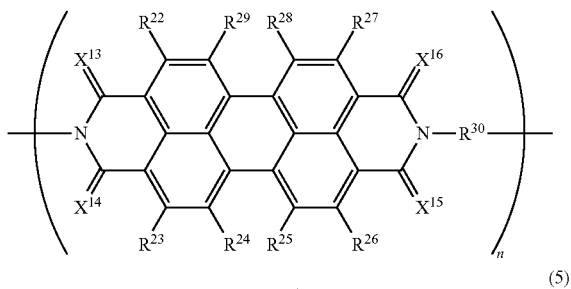

(5)

(6)

(7)

(8)

(9)

wherein, in formulae (1) to (4), each of $R^1$ to $R^4$, $R^7$ to $R^{14}$, $R^{17}$ to $R^{20}$, and $R^{22}$ to $R^{29}$ is independently a hydrogen atom, a halogen atom, a hydroxyl group, an alkoxy group, or a hydrocarbon group;
each of $R^5$, $R^6$, $R^{15}$, and $R^{16}$ is independently a hydrogen atom, a hydroxyl group, an alkoxy group, a hydrocarbon group, or any one of groups represented by formulae (5) to (9), each of $R^{36}$ to $R^{39}$ is independently a hydrogen atom or a halogen atom, and M is a transition metal;
$R^{21}$ and $R^{30}$ are a single bond, an alkylene group, a carbonyl group, an ester group, a nitrogen-containing group, an aromatic group, a heterocyclic group, a phenylene group, an oxygen-containing hydrocarbon chain, a nitrogen-containing hydrocarbon chain, or a group derived from metallocene;
each of $X^1$ to $X^{16}$ is independently an oxygen atom, a sulfur atom, or an organic group,
the groups indicated by $R^1$ to $R^{39}$ and $X^1$ to $X^{16}$ are individually optionally substituted with a substituent; and
m and n are integers of 2 or more.

[3] The aqueous secondary battery according to item [1] or [2], wherein the negative electrode comprises compound (I) having a naphthalenediimide structure or a perylenediimide structure as an active material.

[4] The aqueous secondary battery according to any one of items [1] to [3], wherein the positive electrode comprises compound (I) having a naphthalenediimide structure or a perylenediimide structure as an active material.

[5] The aqueous secondary battery according to item [3], wherein the positive electrode comprises at least one compound selected from the group consisting of compounds represented by the following formulae (10) to (16) as an active material:

[Chemical formula 2]

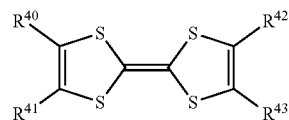
(10)

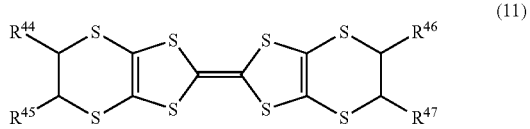
(11)

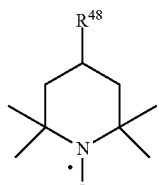
(12)

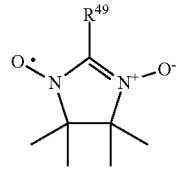
(13)

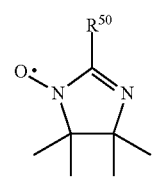
(14)

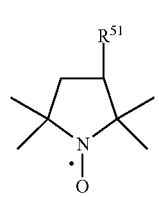
(15)

-continued

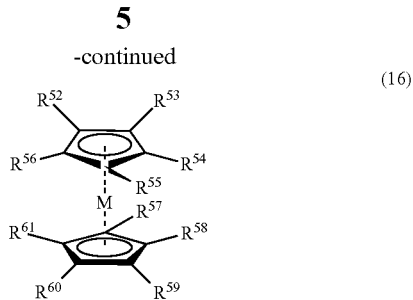

(16)

wherein each of $R^{40}$ to $R^{61}$ is independently a hydrogen atom, a halogen atom, an aromatic group, a heterocyclic group, a carboxyl group, an amino group, a nitro group, a formyl group, a cyano group, a hydroxyl group, an alkoxy group, a thiol group, an alkylthio group, or a hydrocarbon group; M is a transition metal; and the groups indicated by $R^{40}$ to $R^{61}$ are individually optionally substituted with a substituent.

[6] The aqueous secondary battery according to any one of items [1] to [5], which comprises an aqueous electrolytic solution containing at least one type of salt selected from the group consisting of an alkali metal salt and an alkaline earth metal salt.

[7] The aqueous secondary battery according to item [6] above, wherein the aqueous electrolytic solution contains a sodium salt.

[8] The aqueous secondary battery according to any one of items [1] to [7], which comprises a conducting auxiliary, a current collector, and a binder.

[9] A hybrid capacitor comprising compound (I) having a naphthalenediimide structure or a perylenediimide structure as an electrode active material, and having an aqueous electrolytic solution.

Effects of the Invention

The aqueous secondary battery of the present invention includes, in at least either of the positive electrode or the negative electrode, compound (I) having a naphthalenediimide structure or a perylenediimide structure as an active material, and uses an aqueous electrolytic solution. By virtue of this construction, the aqueous secondary battery of the present invention is safer even when the battery is damaged while being used, as compared to a conventional secondary battery using an electrolytic solution containing an organic solvent, and further, has excellent charge/discharge cycle characteristics. Therefore, the aqueous secondary battery of the present invention is dedicated in use as a stationary storage battery, and can be widely used as a power source for IT devices, such as mobile phones and laptop computers, electric vehicles and the like.

MODE FOR CARRYING OUT THE INVENTION

Hereinbelow, the aqueous secondary battery of the present invention will be described in detail. The aqueous secondary battery of the present invention comprises a positive electrode, a negative electrode, and an aqueous electrolytic solution. A characteristic feature of the aqueous secondary battery resides in that at least either of the positive electrode or the negative electrode comprises compound (I) having a naphthalenediimide structure or a perylenediimide structure as an electrode active material, and that the electrolytic solution is an aqueous electrolytic solution. The aqueous secondary battery, if necessary, may have other constituents in addition to the above as long as the above-mentioned features are not sacrificed. The constituents are individually described below.

[Structure of the Aqueous Secondary Battery]

Figure 1:
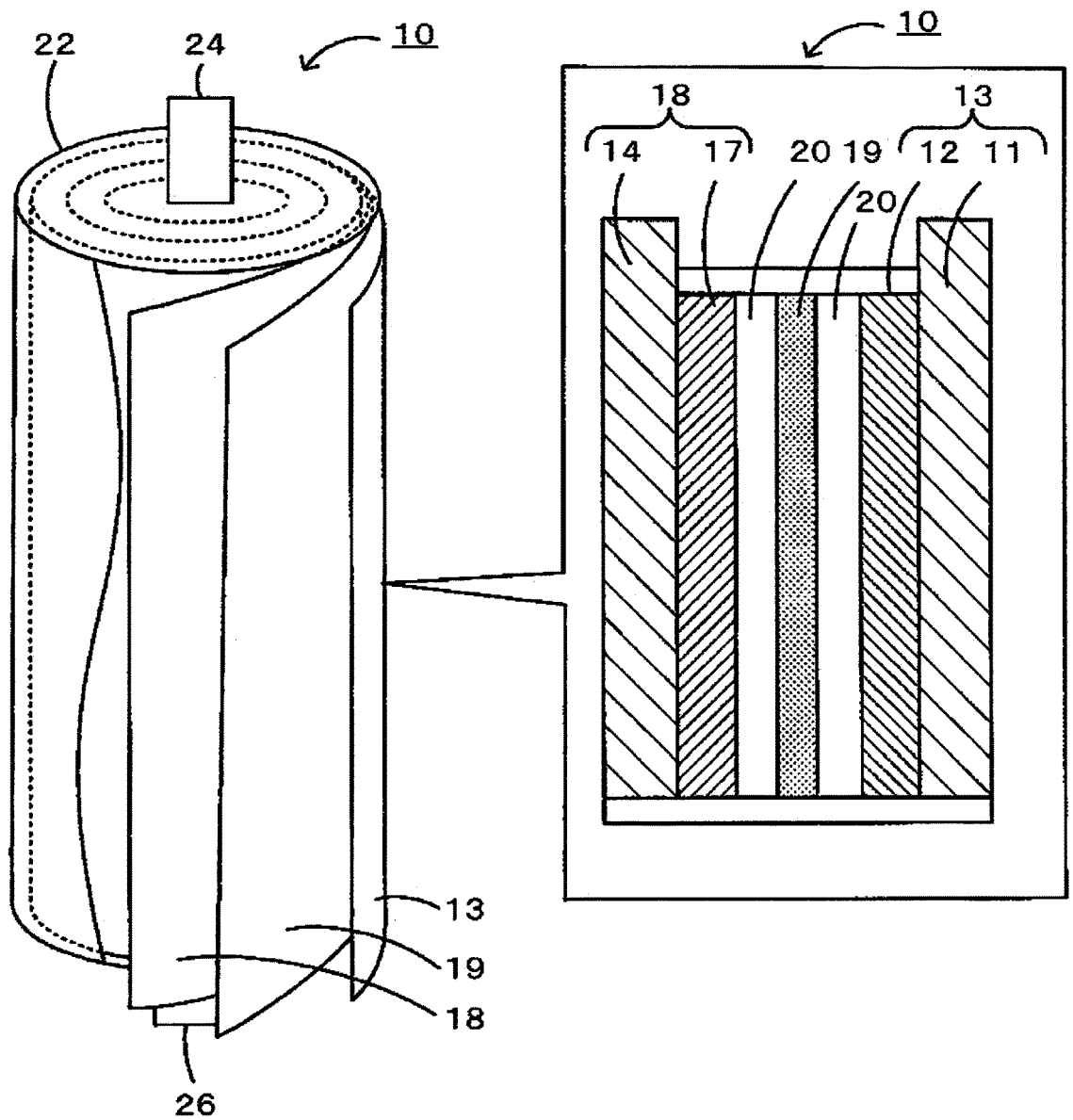
FIG. 1 A diagram showing a schematic structure of an aqueous secondary battery according to one embodiment of the present invention.
Figure 2:
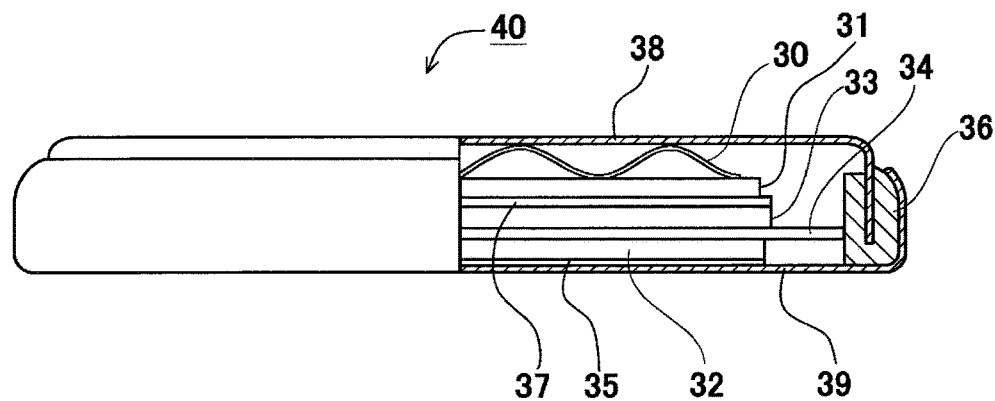
FIG. 2 A diagram showing a schematic structure of an aqueous secondary battery according to one embodiment of the present invention.

First, the form and structure of an aqueous secondary battery according to one embodiment of the present invention are described with reference to FIGS. 1 and 2.

Aqueous secondary battery 10 of a cylindrical form (FIG. 1) according to one embodiment of the present invention comprises positive electrode sheet 13 having positive electrode active material layer 12 formed on positive electrode current collector 11, negative electrode sheet 18 having negative electrode active material layer 17 formed on the surface of negative electrode current collector 14, separator 19 disposed between positive electrode sheet 13 and negative electrode sheet 18, and aqueous electrolytic solution 20 filling the portion between positive electrode sheet 13 and negative electrode sheet 18. A characteristic feature of aqueous secondary battery 10 resides in that at least either of the positive electrode active material layer or the negative electrode active material layer comprises compound (I) having a naphthalenediimide structure or a perylenediimide structure as an electrode active material. In aqueous secondary battery 10, separator 19 is disposed between positive electrode sheet 13 and negative electrode sheet 18, and they are spirally wound together and inserted into cylindrical casing 22, and positive electrode terminal 24 connected to positive electrode sheet 13 and negative electrode terminal 26 connected to negative electrode sheet 18 are arranged to form the aqueous secondary battery.

Aqueous secondary battery 40 of a coin form (FIG. 2) according to one embodiment of the present invention comprises a positive electrode sheet having positive electrode active material layer 32 formed on current collector 35 on the positive electrode side, a negative electrode sheet having negative electrode active material layer 33 formed on current collector 37 on the negative electrode side, and separator 34 disposed between the positive electrode sheet and the negative electrode sheet. Aqueous secondary battery 40 has the positive electrode sheet and negative electrode sheet impregnated with an aqueous electrolytic solution, or has an aqueous electrolytic solution in a gel state. Ring washer 30 is mounted on current collector 37 on the negative electrode side, gasket 36 is placed on the edge, and negative electrode casing 38 is bonded to positive electrode casing 39, and they are externally sealed using, for example, a caulking machine, producing aqueous secondary battery 40 of a coin form. A characteristic feature of aqueous secondary battery 40 resides in that at least either of positive electrode active material layer 32 or negative electrode active material layer 33 comprises compound (I) having a naphthalenediimide structure or a perylenediimide structure as an electrode active material.

(Electrode Active Material)

The aqueous secondary battery of the present invention has, in at least either of the positive electrode or the negative electrode compound (I) having a naphthalenediimide structure or a perylenediimide structure as an electrode active material. Compound (I) is preferably a compound represented by the following formula (1) or (2), or a polymer having structural units represented by the following formula (3) or (4).

[Chemical formula 3]

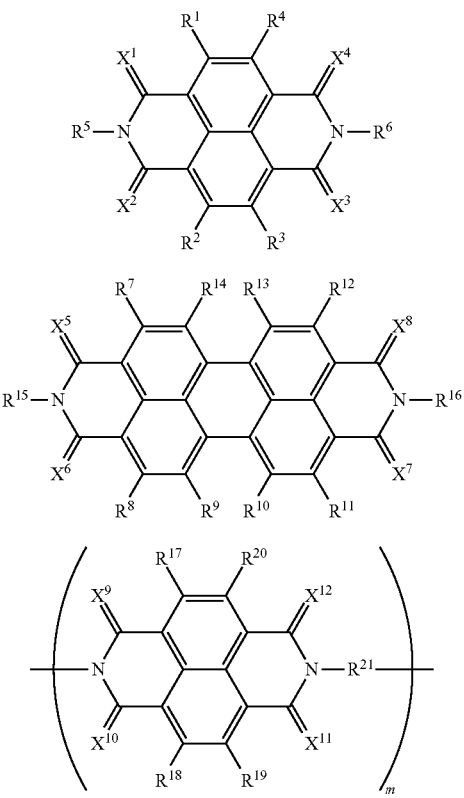

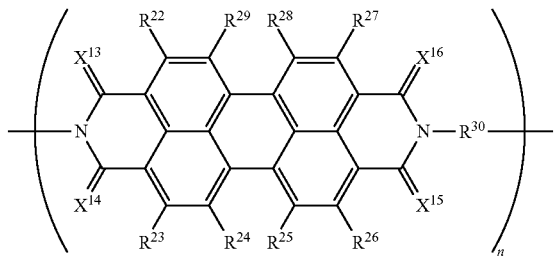

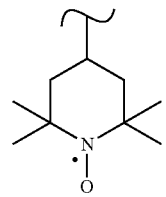

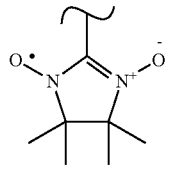

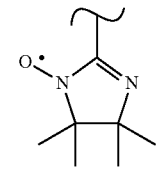

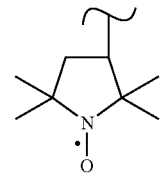

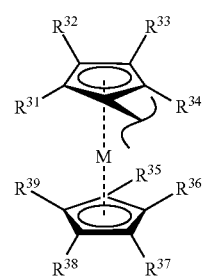

In formulae (1) to (4) above, each of $R^1$ to $R^4$, $R^7$ to $R^{14}$, $R^{17}$ to $R^{20}$, and $R^{22}$ to $R^{29}$ is independently a hydrogen atom, a halogen atom, a hydroxyl group, an alkoxy group, or a hydrocarbon group.

Each of $R^5$, $R^6$, $R^{15}$, and $R^{16}$ is independently a hydrogen atom, a hydroxyl group, an alkoxy group, a hydrocarbon group, or any one of groups represented by formulae (5) to (9). Each of $R^{36}$ to $R^{39}$ is independently a hydrogen atom or a halogen atom. M is a transition metal.

$R^{21}$ and $R^{30}$ are a single bond, an alkylene group, a carbonyl group, an ester group, a nitrogen-containing group, an aromatic group, a heterocyclic group, a phenylene group, an oxygen-containing hydrocarbon chain, a nitrogen-containing hydrocarbon chain, or a group derived from metallocene.

Each of $X^1$ to $X^{16}$ is independently an oxygen atom, a sulfur atom, or an organic group.

The groups indicated by $R^1$ to $R^{39}$ and $X^1$ to $X^{16}$ are individually optionally substituted with a substituent.

m and n are integers of 2 or more.

With respect to $R^1$ to $R^4$, $R^7$ to $R^{14}$, $R^{17}$ to $R^{20}$, and $R^{22}$ to $R^{29}$ in formulae (1) to (4) above, examples of halogen atoms include fluorine, chlorine, bromine, and iodine. Examples of alkoxy groups include a methoxy group, an ethoxy group, a propoxy group, and a butoxy group. Examples of hydrocarbon groups include alkyl groups, such as a methyl group, an ethyl group, a propyl group, a butyl group, a pentyl group, a hexyl group, a heptyl group, an octyl group, a cyclopropyl group, a cyclobutyl group, a cyclopentyl group, and a cyclohexyl group; aryl groups, such as a phenyl group, a naphthyl group, and an anthranil group; aralkyl groups, such as a benzyl group and a phenethyl group; and alkenyl groups, such as a vinyl group, a hexenyl group, a cyclopentenyl group, a cyclohexenyl group, and a cyclohexenyl group.

It is preferred that each of $R^1$ to $R^4$, $R^7$ to $R^{14}$, $R^{17}$ to $R^{20}$, and $R^{22}$ to $R^{29}$ in formulae (1) to (4) is independently a hydrogen atom or a halogen atom, and it is more preferred that all of them are hydrogen atoms.

As examples of the alkoxy groups and hydrocarbon groups with respect to $R^5$, $R^6$, $R^{15}$, and $R^{16}$ in formulae (1) to (4), the same atoms and groups as mentioned above as examples of $R^1$ to $R^4$, $R^7$ to $R^{14}$, $R^{17}$ to $R^{20}$, and $R^{22}$ to $R^{29}$ are given.

In formulae (1) to (4), $R^5$, $R^6$, $R^{15}$, and $R^{16}$ are preferably a hydrocarbon group or a group represented by formulae (5) to (9), more preferably an alkyl group or a group represented by formulae (5) to (9), and even more preferably an alkyl group having 6 carbon atoms or less or a group represented by formula (5) or (9). In the groups represented by formulae (5) to (9), $R^{36}$ to $R^{39}$ are preferably hydrogen atoms. Further, examples of M's in formula (9) include Fe (iron), Ni (nickel), Sc (scandium), Ti (titanium), V (vanadium), Cr (chromium), Mn (manganese), Co (cobalt), Cu (copper), and Zn (zinc). From the viewpoint of improving the cycle characteristics of the aqueous secondary battery, Fe and Ni are preferred, and Fe is more preferred. That is, a more preferred metallocene compound is a ferrocene compound or an oligoferrocene compound of formula (9) wherein M is Fe. The most preferred is ferrocene. M may have added another molecule, such as a halide.

With respect to $R^{21}$ in formula (3) and $R^{30}$ in formula (4), examples of alkylene groups include a methylene group, an ethylene group, a propylene group, and a butylene group. Of these, a methylene group and an ethylene group are preferred. Examples of the aromatic groups include groups having a benzene ring, a naphthalene ring or the like. Examples of the heterocyclic groups include groups having a 5- or 6-membered aromatic heterocycle or an aliphatic heterocycle containing, e.g., a nitrogen atom, an oxygen atom, or a sulfur atom as a heteroatom, such as a pyridine ring, a pyrimidine ring, a furan ring, a thiophene ring, a tetrahydrofuran ring, a tetrahydropyran ring, a pyrrolidine ring, a piperidine ring, or a piperazine ring.

$R^{21}$ in formula (3) and $R^{30}$ in formula (4) are preferably a single bond or an alkylene group, and more preferably an alkylene group, and even more preferably an ethylene group.

In formulae (1) to (4), each of $X^1$ to $X^{16}$ is independently an oxygen atom, a sulfur atom, or an organic group, and $=X^1$ to $X^{16}$ are preferably groups represented by any of the following formulae.

[Chemical formula 4]

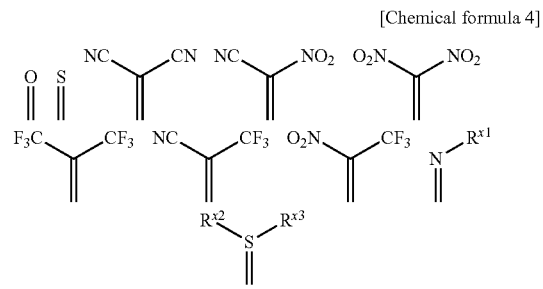

In the above formulae, with respect to $R^{x1}$ to $R^{x3}$, there can be used at least one member of a hydrogen atom, an alkyl group, an aryl group, an aralkyl group, a cycloalkyl group, an alkoxy group, an alkenyl group, an aryloxy group, an arylamino group, an alkylamino group, a thioaryl group, a thioalkyl group, a heterocyclic group, a formyl group, a silyl group, a boryl group, a stannyl group, a cyano group, a nitro group, a nitroso group, an amino group, an imino group, a carboxyl group, an alkoxycarbonyl group, and a halogen atom. These groups may be substituted with a substituent. Furthermore, $R^{x1}$ to $R^{x3}$ may be the same, or may be bonded together to form a saturated or unsaturated ring.

Among the above-mentioned groups, $=O$ is especially preferred. By using $=O$, it is possible to obtain an electrode active material which is more advantageous in that the charge/discharge voltage can be further increased, achieving a secondary battery having an increased energy density.

With respect to compound (I), preferred are compounds represented by the formulae below. In the formulae below, n represents an integer of 2 or more, and m represents an integer of 0 or more.

[Chemical formula 5]

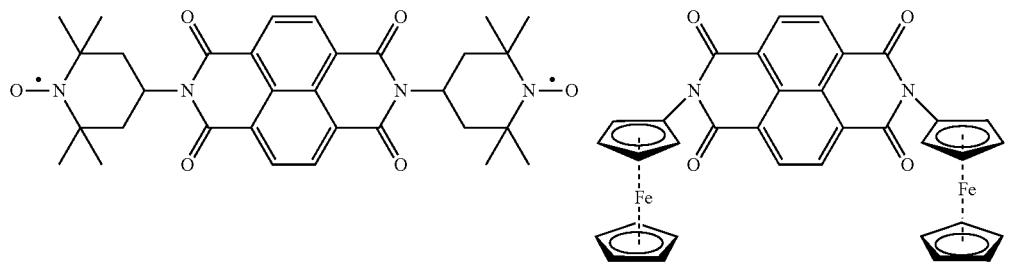

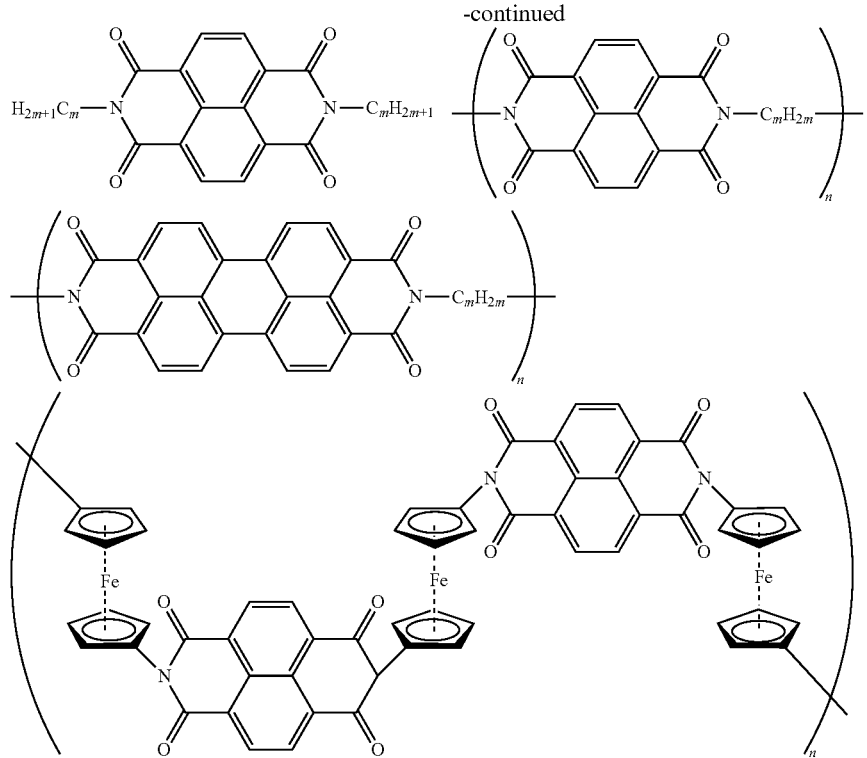

With respect to compound (I), more preferred are compounds represented by the formulae below. In the formulae below, n represents an integer of 2 or more.

[Chemical formula 6]

(I-1)
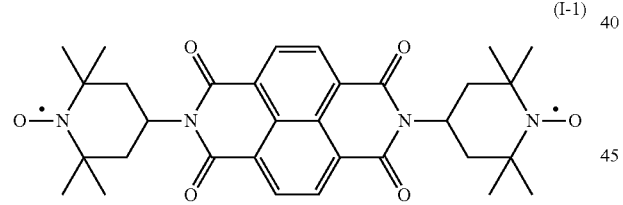

(I-2)
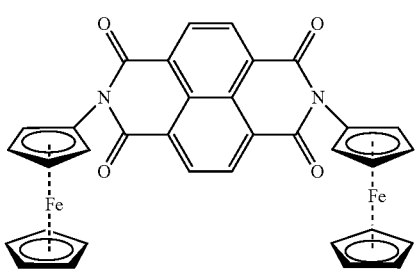

(I-3)
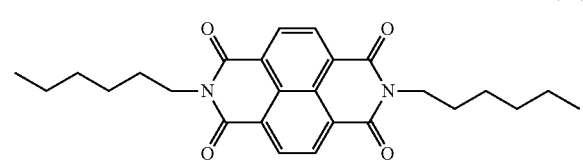

(I-4)
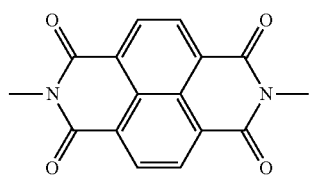

(I-5)
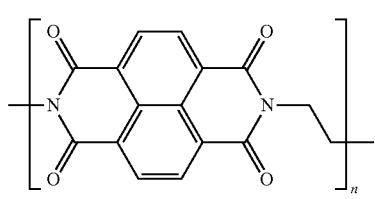

(I-6)
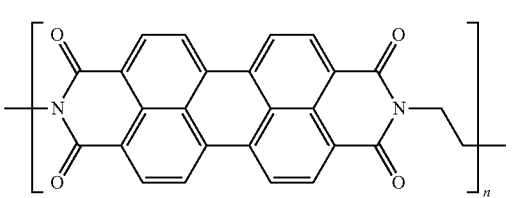

In the aqueous secondary battery of the present invention, the positive electrode may comprise compound (I) as an electrode active material, or the negative electrode may comprise compound (I) as an electrode active material. Both the positive electrode and the negative electrode may comprise compound (I) as an electrode active material. When only either of the positive electrode or the negative electrode comprises compound (I) as an electrode active material, it is preferred that the negative electrode is an electrode that comprises compound (I) as an electrode active material.

When only either of the positive electrode or the negative electrode comprises compound (I) as an electrode active material, with respect to the electrode active material for the counter electrode, there is no particular limitation as long as it satisfactorily exhibits secondary battery performance. However, compounds represented by the following formulae (10) to (16) may be given as examples.

[Chemical formula 7]

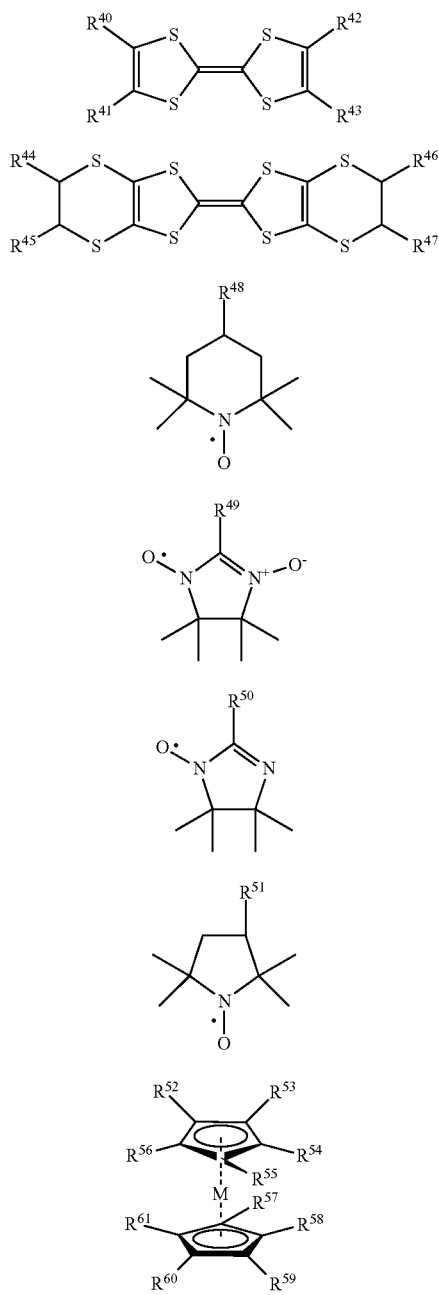

In formulae (10) to (16), each of $R^{40}$ to $R^{61}$ is independently a hydrogen atom, a halogen atom, an aromatic group, a heterocyclic group, a carboxyl group, an amino group, a nitro group, a formyl group, a cyano group, a hydroxyl group, an alkoxy group, a thiol group, an alkylthio group, or a hydrocarbon group. M is a transition metal. The groups indicated by $R^{40}$ to $R^{61}$ are individually optionally substituted with a substituent.

With respect to $R^{40}$ to $R^{61}$ in formulae (10) to (16), examples of the alkoxy groups include a methoxy group, an ethoxy group, a propoxy group, and a butoxy group. Examples of the alkylthio groups include a methylthio group, an ethylthio group, and a propylthio group. Examples of the hydrocarbon groups include alkyl groups, such as a methyl group, an ethyl group, a propyl group, a butyl group, a pentyl group, a hexyl group, a heptyl group, an octyl group, a cyclopropyl group, a cyclobutyl group, a cyclopentyl group, and a cyclohexyl group; aryl groups, such as a phenyl group, a naphthyl group, and an anthranil group; aralkyl groups, such as a benzyl group and a phenethyl group; and alkenyl groups, such as a vinyl group, a hexenyl group, a cyclopentenyl group, a cyclohexenyl group, and a cyclohexenyl group.

Examples of M's in formula (16) include Fe (iron), Ni (nickel), Sc (scandium), Ti (titanium), V (vanadium), Cr (chromium), Mn (manganese), Co (cobalt), Cu (copper), and Zn (zinc). From the viewpoint of improving the cycle characteristics of the aqueous secondary battery, Fe and Ni are preferred, and Fe is more preferred. That is, with respect to the electrode active material represented by formula (16) above, preferred is a ferrocene compound or an oligoferrocene compound of formula (16) wherein M is Fe, and ferrocene is more preferred. M may have added another molecule, such as a halide.

$R^{40}$ to $R^{61}$ in formulae (10) to (16) are preferably a hydrogen atom or an alkyl group, and more preferably a hydrogen atom.

With respect to the electrode active material for the counter electrode in the aqueous secondary battery of the present invention, preferred are oligomers comprising structural units derived from compounds represented by formulae (12) to (16).

With respect to the electrode active material for the counter electrode in the aqueous secondary battery of the present invention, examples of preferred compounds include tetrathiafulvalene (TTF), bis(ethylenedithio)tetrathiafulvalene (BEDT-TTF), a ferrocene polymer, and a nitroxide polymer, which are represented by the formulae below. These compounds are preferably used as a positive electrode active material.

[Chemical formula 8]

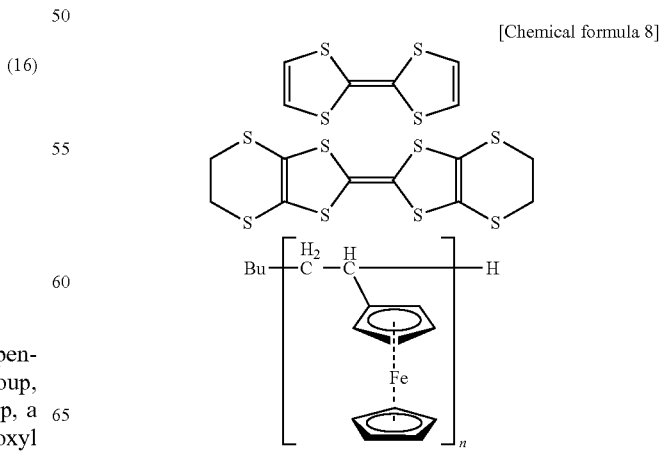

-continued

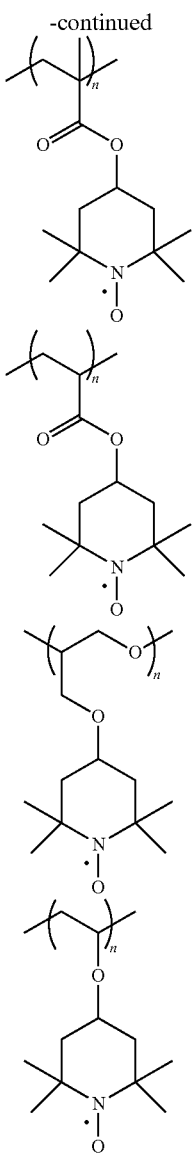

In the aqueous secondary battery of the present invention, with respect to the combination of the positive electrode active material and the negative electrode active material, preferred are:

(i) a combination of a compound other than compound (I) used as the positive electrode active material and compound (I) used as the negative electrode active material, and (ii) compound (I) used as both the positive electrode active material and the negative electrode active material.

In the case of (i), with respect to the compound other than compound (I), preferred are TTF, BEDT-TTF, a ferrocene polymer, and a nitroxide polymer. Particularly, a combination of BEDT-TTF used as the positive electrode active material and the compound of formula (I-3) used as the negative electrode active material is preferred. In the case of (ii), with respect to the combination of compounds (I), a combination of the compound of formula (I-1) used as the positive electrode active material and the compound of formula (I-3) used as the negative electrode active material is preferred.

The positive electrode or negative electrode in the aqueous secondary battery of the present invention may comprise, for example, a conducting auxiliary or a binder in addition to the above-mentioned active materials.

With respect to the conducting auxiliary contained in the positive electrode and negative electrode, for example, a carbonaceous material, a conductive polymer, a powdered metal, or an inorganic conductive oxide can be used. Examples of carbonaceous materials include activated carbon, activated carbon fibers, porous carbon, graphite, carbon black, carbon nanotubes, carbon nanofibers, carbon nanohorns, and graphene. Examples of conductive polymers include polyaniline, polyacetylene, polyfluorene, polypyrrole, and polythiophene. Examples of powdered metals include aluminum, gold, and platinum. Of these, preferred is a carbonaceous material, and especially preferred is activated carbon.

With respect to the binder contained in the positive electrode and negative electrode, one which does not degrade in the potential region used that is suitable for use can be selected and used. Examples of binders include polyvinylidene fluoride, polytetrafluoroethylene, carboxymethyl cellulose, a styrene-butadiene rubber, polyacrylic acid, a polyimide resin, a polyamide resin, and a fluororubber.

With respect to each of the conducting auxiliary and binder contained in the positive electrode and negative electrode, the above-mentioned materials may be used individually or in combination.

With respect to the active material layer in the negative electrode and the active material layer in the positive electrode, the ratio of the positive or negative electrode active material, the conducting auxiliary, and the binder in each electrode active material layer, in terms of mass, may be appropriately adjusted within the following range: 5 to 100% by mass: 0 to 100% by mass: 0 to 30% by mass. The conducting auxiliary and binder may not be added. Furthermore, with respect to the thickness of each of the negative electrode active material layer and the positive electrode active material layer, there is no particular limitation.

(Aqueous Electrolytic Solution)

The aqueous electrolytic solution in the present invention contains water and at least one water-soluble salt. The water-soluble salt is preferably at least one salt selected from the group consisting of a salt of an alkali metal element and a salt of an alkaline earth metal element, more preferably at least one type of salt selected from the group consisting of a sodium salt, a magnesium salt, a calcium salt, a lithium salt, a potassium salt, and a beryllium salt, further preferably a sodium salt, a magnesium salt, a lithium salt, or a potassium salt, especially preferably a sodium salt.

With respect to the type of anions contained in the water-soluble salt, there is no particular limitation. Examples of anions include halide ions, sulfate ions, nitrate ions, phosphate ions, and tetrafluoroborate ions. Specific examples of halide ions include chloride ions, bromide ions, and iodide ions.

The water-soluble salt is preferably a neutral salt or alkaline salt at 25° C., more preferably a neutral salt. Among neutral salts, more preferred are at least one neutral sodium salt selected from a group consisting of sodium chloride, sodium bromide, sodium iodide, sodium sulfate, sodium nitrate, and sodium tetrafluoroborate, etc.; at least one neutral magnesium salt selected from a group consisting of magnesium chloride, magnesium bromide, magnesium iodide, magnesium sulfate, magnesium nitrate, and magnesium tetrafluoroborate, etc.; at least one neutral lithium salt selected from a group consisting of lithium chloride, lithium bromide, and lithium tetrafluoroborate, etc.; and at least one neutral potassium salt selected from a group consisting of potassium chloride, potassium bromide, potassium iodide, and potassium tetrafluoroborate. More preferred are, for example, sodium chloride, sodium sulfate, and magnesium chloride, and especially preferred is sodium chloride.

The concentration of the water-soluble salt in the aqueous electrolytic solution is appropriately selected according to, for example, the type of water-soluble salt. With respect to the concentration of the water-soluble salt in the aqueous electrolytic solution, the solubility varies depending on the temperature or solute, but, for example, in the case where the aqueous electrolytic solution is at 20° C., when the water-soluble salt is sodium chloride, the concentration is preferably in the range of 0.1 to 6.1 mol/L, and, when the water-soluble salt is magnesium chloride, the concentration is preferably in the range of 0.1 to 5.7 mol/L. The concentration of the water-soluble salt in the aqueous electrolytic solution may be the saturated solubility or less, and may preferably be higher.

The aqueous electrolytic solution may contain a water-soluble organic solvent. Examples of organic solvents include acetonitrile and acetone.

When the aqueous electrolytic solution contains an organic solvent, the content of the organic solvent in water is more than 0 to 50% by mass, preferably more than 0 to 10% by mass.

The aqueous electrolytic solution may contain various additives if necessary. Examples of additives include sodium sulfite; and gelling agents, such as carboxymethyl cellulose.

The aqueous electrolytic solution preferably has a dissolved oxygen amount of 7.3 ppm or less. When the dissolved oxygen amount of the aqueous electrolytic solution is 7.3 ppm or less, it is likely that the cycle characteristics of the secondary battery are further improved. More preferred dissolved oxygen amount is 5 ppm or less, and most preferred dissolved oxygen amount is 4 ppm or less.

Generally, the saturated dissolved oxygen amount in an aqueous electrolytic solution at room temperature (22 to 23° C.) is 8.2 to 8.6 ppm, and the dissolved oxygen amount can be reduced to 7.3 ppm or less by an operation generally used. For example, the dissolved oxygen amount of an aqueous electrolytic solution can be maintained within a desired range by deaerating the electrolytic solution at least once during the production of the battery, or alternatively, providing a packing with the battery being produced to form a structure that suppresses the increase in oxygen amount. The method for deaeration is appropriately selected from the methods generally used such as depressurizing or heating.

In the secondary battery of the present invention, the aqueous electrolytic solution includes an aqueous electrolytic solution in a gel state that is obtained using a gelling agent. The aqueous electrolytic solution in a gel state of the present invention is an aqueous electrolytic solution in a liquid state, changed into a gel state, and this can be obtained by adding a gelling agent to the aqueous electrolytic solution in a liquid state. In the present invention, the term "gel state" indicates a state of a kind of dispersed system that is a colloid in a liquid dispersing medium like a sol, which has high viscosity due to the network of the dispersoid and has lost fluidity so that the system is collectively in a solid state. The aqueous electrolytic solution may be sealed in the inner space of a container casing, or it may be impregnated into an electrode sheet or the like. The aqueous electrolytic solution in a gel state can be prepared by, for example, a method in which an electrolytic solution in a liquid state is placed in a glass bottle, an appropriate amount of carboxymethyl cellulose is added to the electrolytic solution and crushed using a spatula, and the resultant mixture stirred using a homomixer at 10,000 rpm at room temperature for about 5 minutes.

In the battery of an open system, the dissolved oxygen amount in the aqueous electrolytic solution can be reduced by inserting a tube into the aqueous electrolytic solution and allowing nitrogen gas to bubble permanently.

(Separator)

The aqueous secondary battery may comprise a separator. The separator is disposed so as to cause the positive electrode and the negative electrode to be separate from each other, and it is required to pass ions through itself and to prevent the occurrence of short-circuiting between the positive and negative electrodes. With respect to the separator, there is no particular limitation, and a conventionally known separator can be used. For example, nonwoven fabric made of a polyolefin fiber, a microporous film made of a polyolefin, a glass filter, or a ceramic porous material can be used.

(Current Collector)

The aqueous secondary battery may comprise a current collector (a positive electrode current collector and a negative electrode current collector). As a material for the positive electrode current collector and the negative electrode current collector, there is used a material which does not cause a side reaction at the respective potentials of the positive electrode and the negative electrode. More specifically, in the positive electrode current collector and the negative electrode current collector, there may be used a material that is corrosion resistant in which reactions, such as dissolution, is not caused at the respective potentials of the positive electrode and the negative electrode. As a material for the positive electrode current collector and the negative electrode current collector, for example, a metal material, an alloy, a carbonaceous material, or an inorganic conductive oxide material can be used. Examples of metal materials include copper, nickel, brass, zinc, aluminum, stainless steel, tungsten, gold, and platinum. Examples of alloys include SUS. Examples of carbonaceous materials include graphite, hard carbon, and glassy carbon.

[Method for Producing the Aqueous Secondary Battery]

The aqueous secondary battery of the present invention is produced by sealing a negative electrode, a positive electrode, and an electrolytic solution in a container casing, such as a cylindrical casing or a coin-form casing. The specific procedure for the production is described in detail in the Examples below.

The aqueous secondary battery of the present invention may be in any form. Examples of forms include a cylindrical form, a coin form, a button form, a sheet form, a stacked form, a cylindrical form, a flattened form, and a rectangular form. Further, the aqueous secondary battery may be applied to a large-size secondary battery for use in, for example, an electric vehicle.

[Electric Power Storage Device]

An electric power storage device having a positive electrode and a negative electrode, wherein at least either of the positive electrode or the negative electrode comprises compound (I) having a naphthalenediimide structure or a perylenediimide structure as an active material, and having an aqueous electrolytic solution is also included in the present invention. With respect to the electric power storage device of the present invention, there can be mentioned, for example, a hybrid capacitor that is a device which stores and releases energy utilizing a chemical reaction of an electrode comprising the above-mentioned compound (I) having a naphthalenediimide structure or a perylenediimide structure and physical phenomena with adsorption and desorption of ions in an electrical double layer formed at the electrode interface of a carbonaceous material the conducting auxiliary in the counter electrode. When the electric power storage device is a hybrid capacitor, the hybrid capacitor can realize a higher energy density, as compared to a capacitor formed only of a conducting auxiliary. Further, since an aqueous electrolytic solution is used, it is very safe. With respect to the descriptions of the electrodes and aqueous electrolytic solution of the electric power storage device of the present invention, the corresponding descriptions made in connection with the aqueous secondary battery of the present invention can be applied.

Examples

Hereinbelow, specific embodiments of the present invention will be described with reference to the following Examples, which should not be construed as limiting the scope of the present invention.
<Production of an Aqueous Secondary Battery>
(Preparation of a Positive Electrode and a Negative Electrode—Method 1)

Carbonaceous materials (activated carbon and carbon black) which are a conducting auxiliary was caused to have a positive electrode active material carried thereon. In a mortar, the carbon having the positive electrode active material carried thereon, and a carbonaceous material having no material carried thereon as a conducting auxiliary, and polytetrafluoroethylene (PTFE) as a binder were mixed together, followed by kneading. The resultant mixture was rolled out using a roller press to form a sheet.
(Preparation of a Positive Electrode and a Negative Electrode—Method 2)

Carbonaceous materials (activated carbon and carbon black) which are a conducting auxiliary was made to support a positive electrode active material. In a mortar, the carbon supporting the positive electrode active material, as well as a carbonaceous material supporting no material as a conducting auxiliary and an electrolytic solution were mixed to the weight of the electrode and the resultant mixture was kneaded, and then polytetrafluoroethylene (PTFE) was mixed as a binder, followed by kneading. The resultant mixture was rolled out using a roller press to form a sheet.
(Assembling of a Battery: Beaker Cell)

The obtained positive electrode and negative electrode were cut into a circular form and bonded to a platinum mesh having attached a platinum wire. Then, the electrodes were attached to a glass sample bottle cell. The platinum mesh having the electrodes bonded to the glass sample bottle cell was immersed in an electrolytic solution, and the electrodes were impregnated with the electrolytic solution under a vacuum atmosphere.
(Assembling of a Battery: Coin Cell)

The obtained positive electrode and negative electrode were cut into a circular form, and the electrodes were placed on a current collector. A separator was disposed between the positive electrode and the negative electrode, and a material in a gel state comprised of carboxymethyl cellulose and 3 M NaCl (aqueous electrolytic solution in a gel state) was disposed between the electrode and the separator. Where necessary, the electrodes were immersed in an electrolytic solution and were impregnated with the electrolytic solution under a vacuum atmosphere.
(Assembling of a Cell for Cyclic Voltammetry)

The electrode sheet obtained by Method 1 was bonded to a platinum mesh having attached a platinum wire to form a working electrode. An electrode comprising activated carbon and PTFE as the counter electrode was press-bonded to the electrode having attached the platinum wire. An electrolytic solution was placed in a glass sample bottle cell. The sample bottle cell was sealed with a lid, and a tube was inserted into the electrode to allow nitrogen gas to bubble permanently.
(Cyclic Voltammetry)

Figure 3:
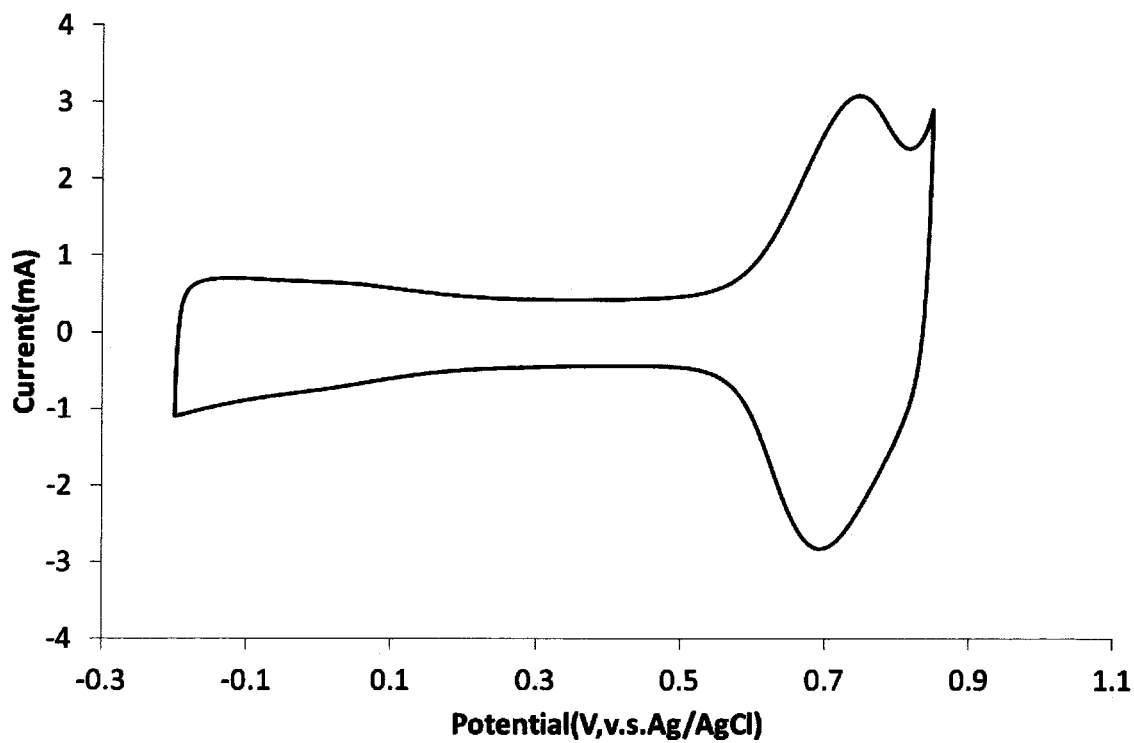
FIG. 3 A cyclic voltammogram of an aqueous secondary battery in Example 1.
Figure 4:
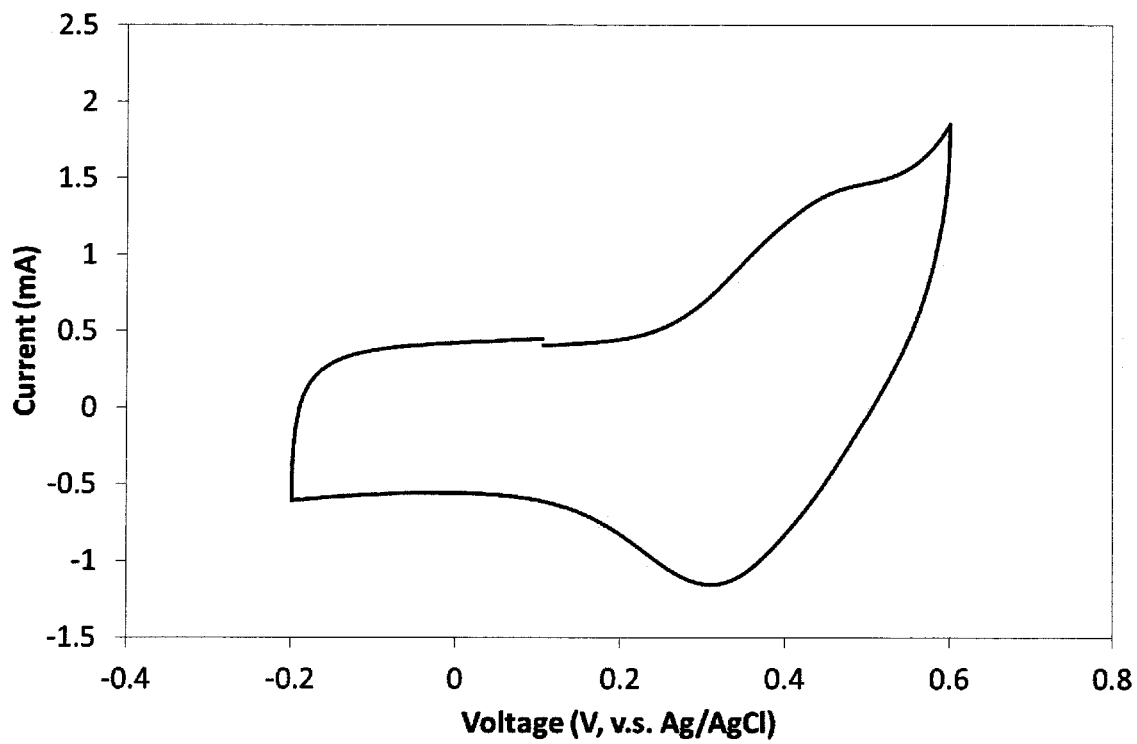
FIG. 4 A cyclic voltammogram of an aqueous secondary battery in Example 2.
Figure 5:
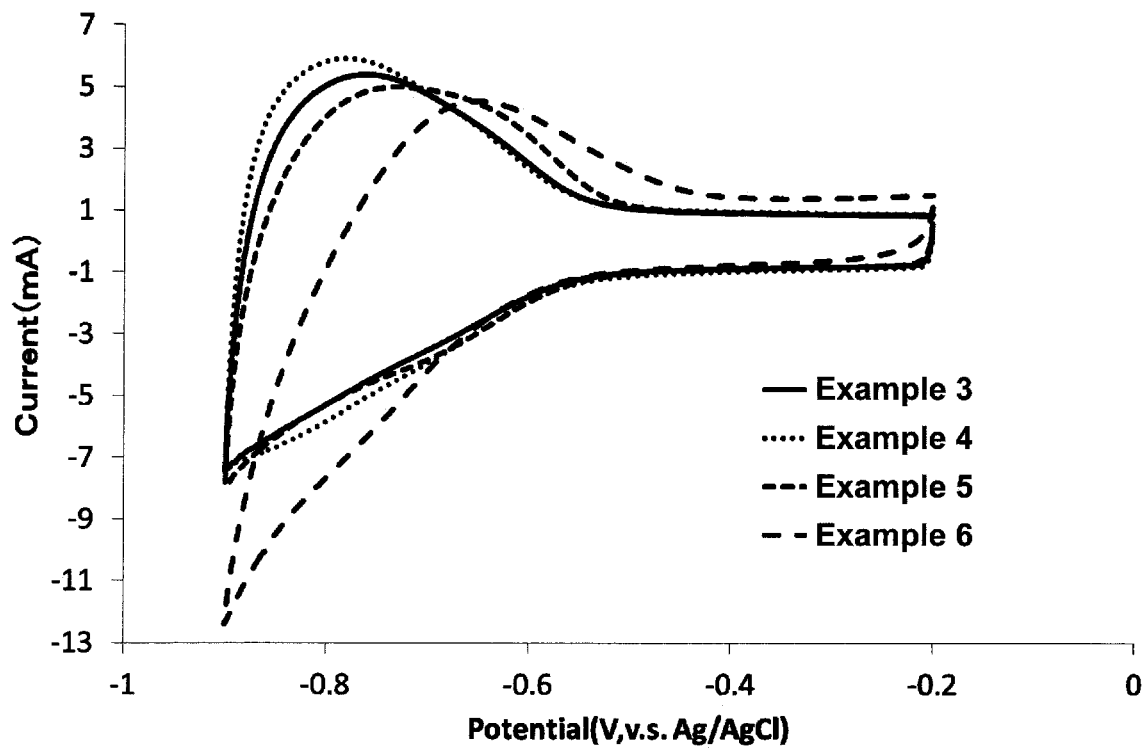
FIG. 5 Cyclic voltammograms of aqueous secondary batteries in Examples 3 to 6.
Figure 6:
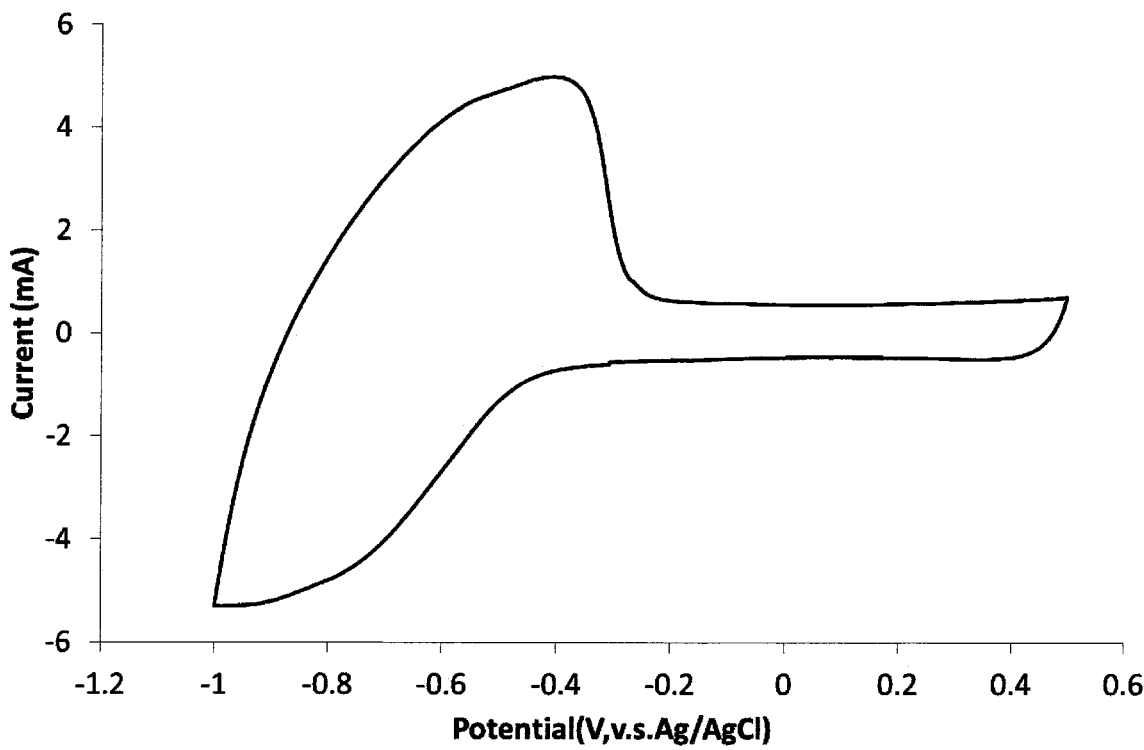
FIG. 6 A cyclic voltammogram of an aqueous secondary battery in Example 7.
Figure 7:
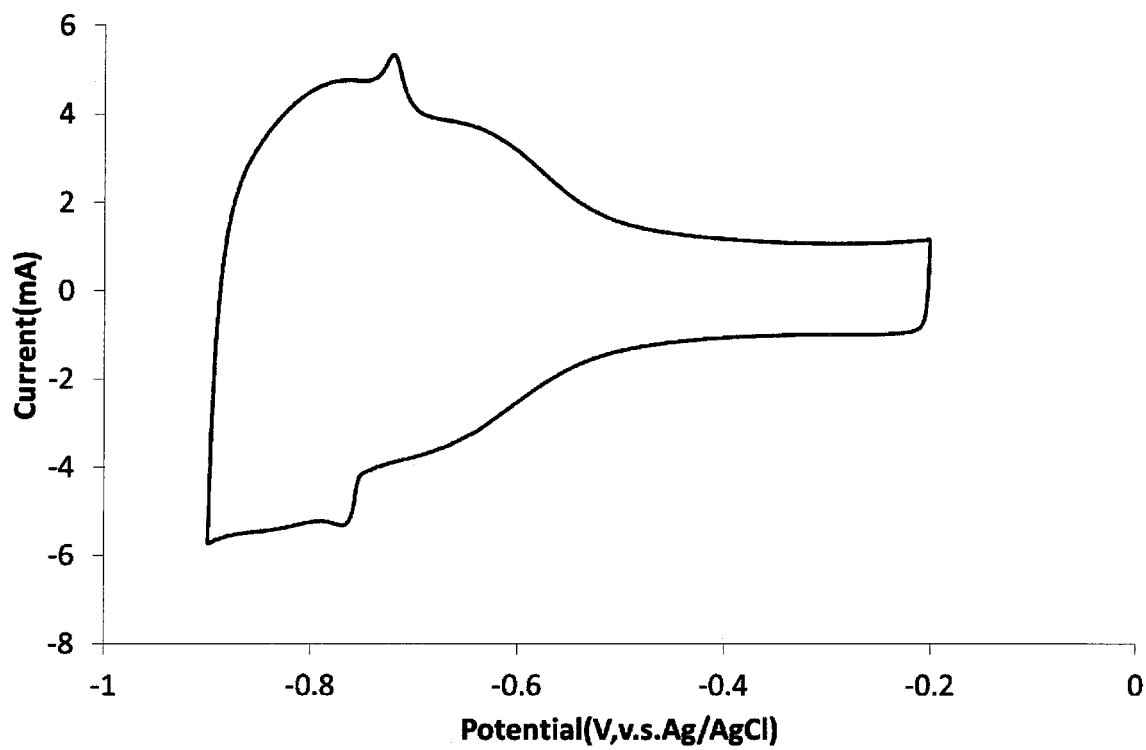
FIG. 7 A cyclic voltammogram of an aqueous secondary battery in Example 8.
Figure 8:
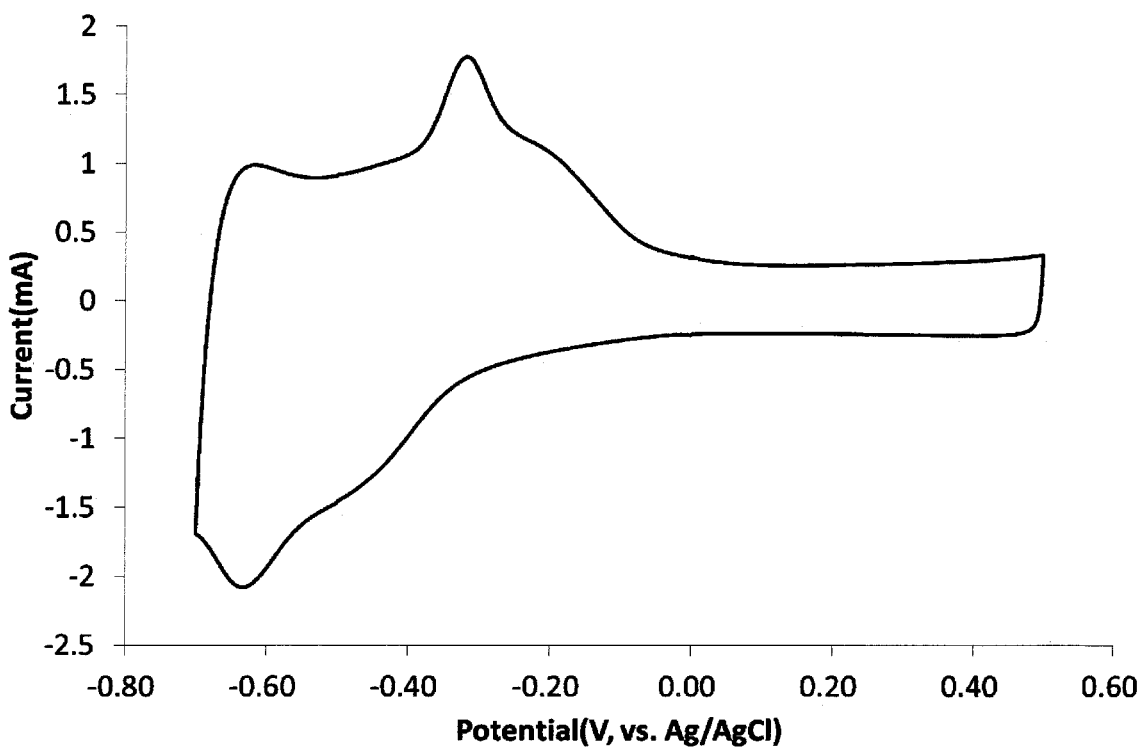
FIG. 8 A cyclic voltammogram of an aqueous secondary battery in Example 9.
Figure 9:
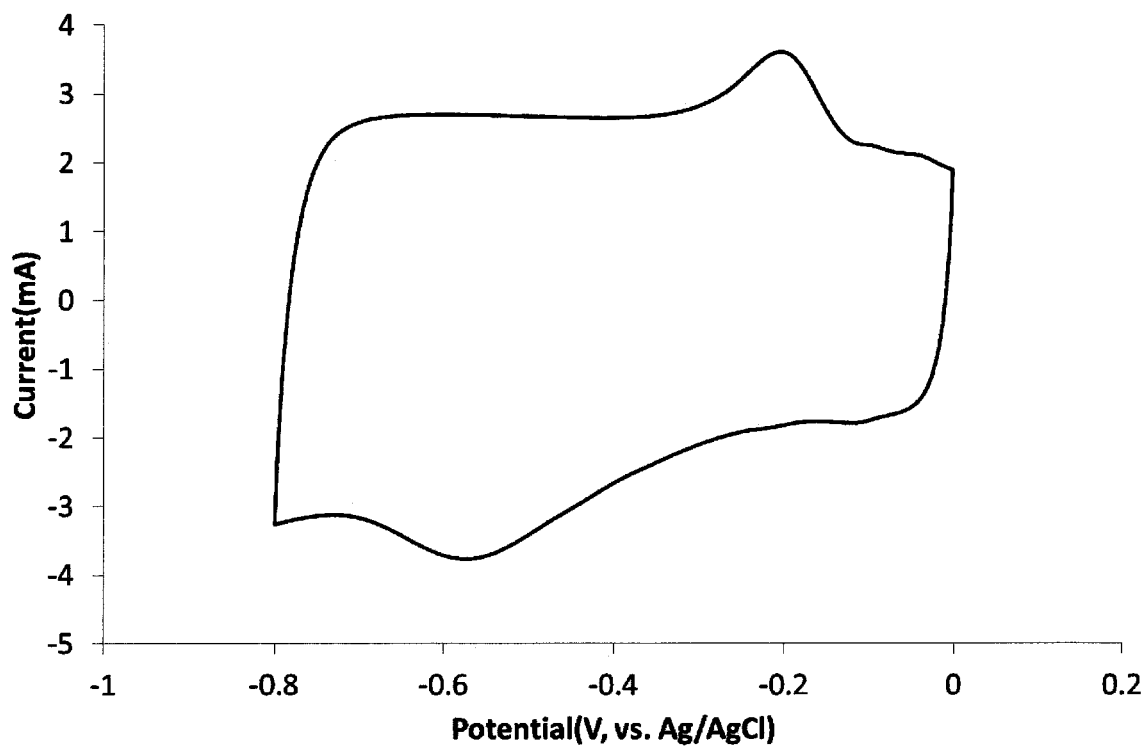
FIG. 9 A cyclic voltammogram of an aqueous secondary battery in Example 10.
Figure 10:
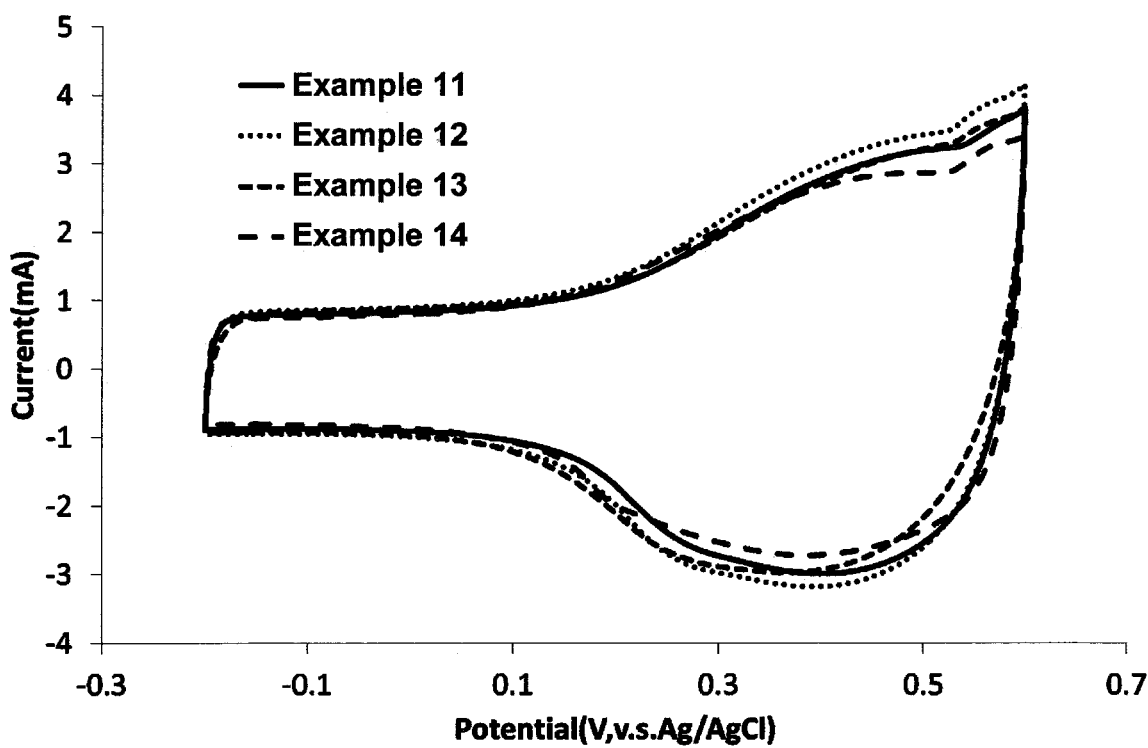
FIG. 10 Cyclic voltammograms of aqueous secondary batteries in Examples 11 to 14.
Figure 11:
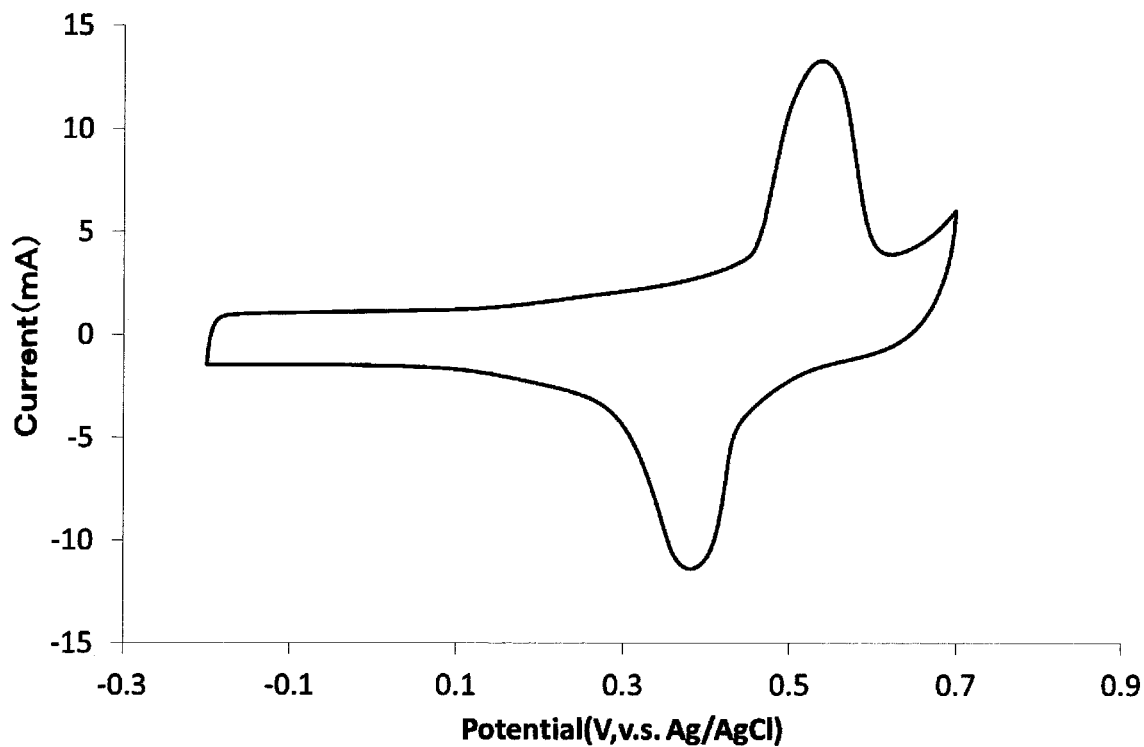
FIG. 11 A cyclic voltammogram of an aqueous secondary battery in Example 15.
Figure 12:
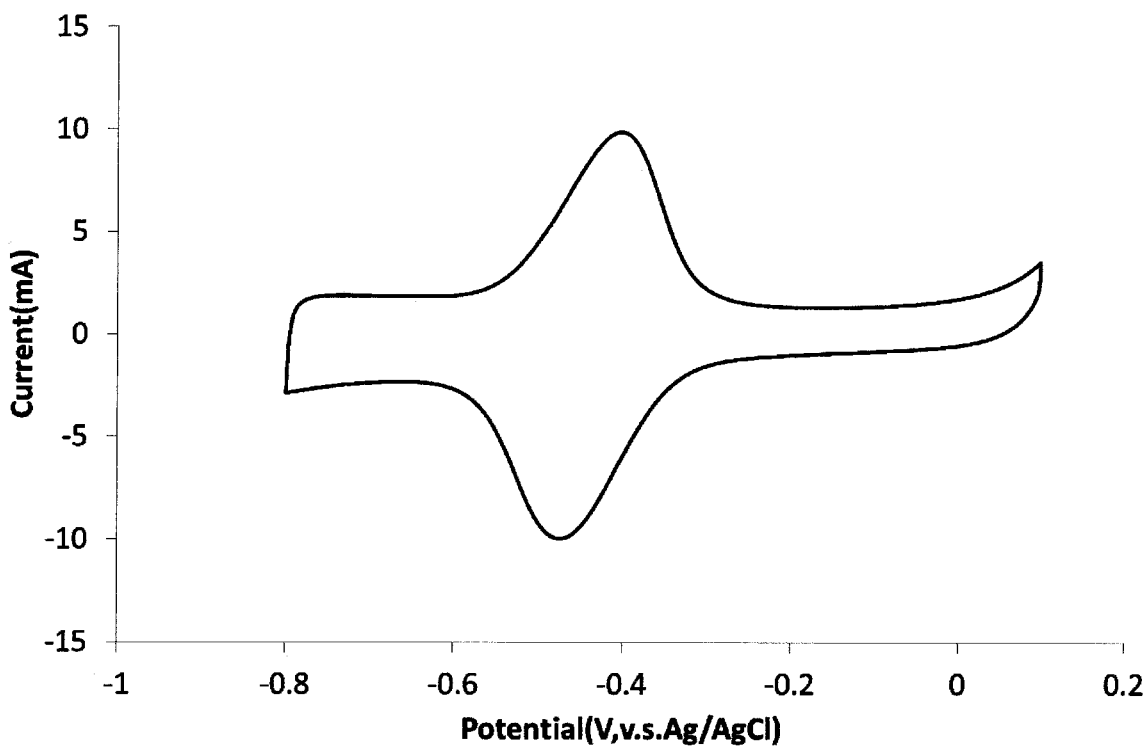
FIG. 12 A cyclic voltammogram of an aqueous secondary battery in Example 16.

Cells for cyclic voltammetry were each assembled under the respective conditions for preparing the working electrode and the counter electrode, as well as the types of electrolytic solutions shown in Table 1. As a reference electrode, Ag/AgCl was used, and the cells in Examples 1 to 16 were subjected to cyclic voltammetry. The sweep range and sweep rate in each Example are also shown in Table 1. The cyclic voltammogram in Example 1 is shown in FIG. 3, Example 2 in FIG. 4, Examples 3 to 6 in FIG. 5, Example 7 in FIG. 6, Example 8 in FIG. 7, Example 9 in FIG. 8, Example 10 in FIG. 9, Examples 11 to 14 in FIG. 10, Example 15 in FIG. 11, and Example 16 in FIG. 12.

The counter electrode was prepared by kneading activated carbon, carbon black, and PTFE and forming the kneaded mixture into a sheet so that the weight of the resultant electrode became twice or more the weight of the working electrode.

TABLE 1

| | | | Working electrode | | | | |
|---|---|---|---|---|---|---|---|
| | Positive/ Negative | Active material[1] | Compositional ratio for electrode Active material/Activated carbon/KB/PTFE | Weight of electrode (mg) | Electrolytic solution | Sweep range (V) | Sweep rate (mV/s) |
| Example 1 | Positive electrode | 1-1 | 2/5/0.78/0.78 | 17.0 | 3M-NaCl | −0.2~0.85 | 1 |
| Example 2 | Negative electrode | 1-2 | 2/5/0.78/0.78 | 19.0 | 3M-NaCl | −0.2~0.6 | 1 |
| Example 3 | Negative electrode | 1-3 | 2/5/0.78/0.78 | 17.0 | 3M-NaCl | −0.9~0.2 | 1 |
| Example 4 | Negative electrode | 1-3 | 2/5/0.78/0.78 | 17.0 | 3M-KCl | −0.9~0.2 | 1 |
| Example 5 | Negative electrode | 1-3 | 2/5/0.78/0.78 | 17.0 | 3M-LiCl | −0.9~0.2 | 1 |
| Example 6 | Negative electrode | 1-3 | 2/5/0.78/0.78 | 19.0 | 3M-$MgCl_2$ | −0.9~0.2 | 1 |
| Example 7 | Negative electrode | 1-4 | 2/5/0.78/0.78 | 8.0 | 3M-NaCl | −1~0.5 | 1 |

TABLE 1-continued

| | Positive/Negative | Active material[1] | Working electrode Compositional ratio for electrode Active material/Activated carbon/KB/PTFE | Weight of electrode (mg) | Electrolytic solution | Sweep range (V) | Sweep rate (mV/s) |
|---|---|---|---|---|---|---|---|
| Example 8 | Negative electrode | 1-1 | 2/5/0.78* | 27.7 | 3M-NaCl | −0.9~0.2 | 1 |
| Example 9 | Negative electrode | 1-5 | 2/5/0.78/0.78 | 11.0 | 3M-NaCl | −0.7~0.5 | 0.5 |
| Example 10 | Negative electrode | 1-6 | 2/5/0.78/0.78 | 19.0 | 3M-NaCl | −0.8~0 | 1 |
| Example 11 | Negative electrode | 1-7 | 2/5/0.78/0.78 | 19.0 | 3M-NaCl | −0.2~0.6 | 1 |
| Example 12 | Negative electrode | 1-7 | 2/5/0.78/0.78 | 20.0 | 3M-KCl | −0.2~0.6 | 1 |
| Example 13 | Negative electrode | 1 7 | 2/5/0.78/0.78 | 17.0 | 3M-LiCl | −0.2~0.6 | 1 |
| Example 14 | Negative electrode | 1-7 | 2/5/0.78/0.78 | 17.0 | 3M-MgCl$_2$ | −0.2~0.6 | 1 |
| Example 15 | Negative electrode | 1-8 | 2/5/0.78/0.78 | 19.0 | 3M-NaCl | −0.2~0.7 | 1 |
| Example 16 | Negative electrode | 1-1 | 2/5/0.78/0.78 | 19.0 | 3M-NaCl | −0.8~0.1 | 1 |

With respect to "Active material[1]" in Table 1, the below-shown compounds of (I-1) to (I-8) were used.

[Chemical formula 9]

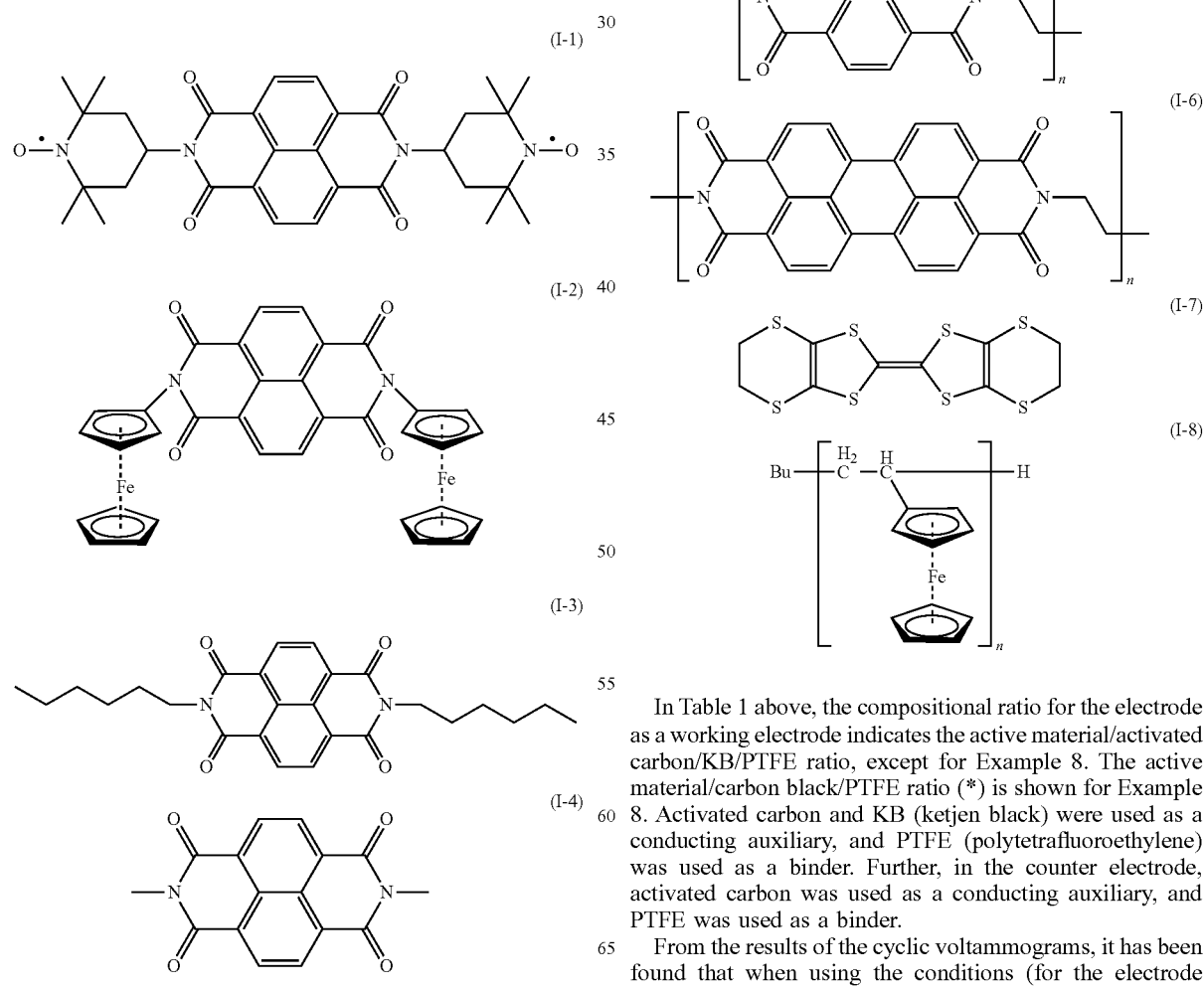

In Table 1 above, the compositional ratio for the electrode as a working electrode indicates the active material/activated carbon/KB/PTFE ratio, except for Example 8. The active material/carbon black/PTFE ratio (*) is shown for Example 8. Activated carbon and KB (ketjen black) were used as a conducting auxiliary, and PTFE (polytetrafluoroethylene) was used as a binder. Further, in the counter electrode, activated carbon was used as a conducting auxiliary, and PTFE was used as a binder.

From the results of the cyclic voltammograms, it has been found that when using the conditions (for the electrode active material and aqueous electrolytic solution) in Examples 1 to 16, an electric power storage device capable of repeating charging and discharging at high output can be obtained.

Figure 15:
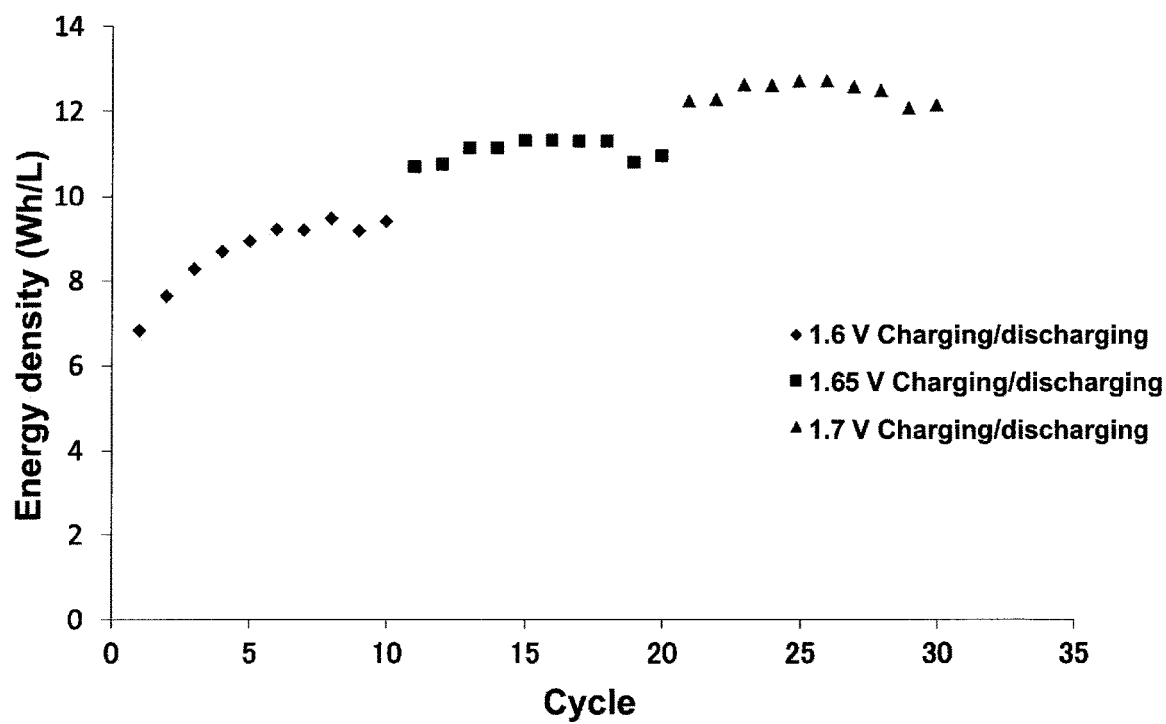
FIG. 15 A diagram showing the cycle characteristics of the aqueous secondary battery in Example 25.

The aqueous secondary batteries in Examples 17 to 25 were produced according to the above-mentioned method. The types and masses of the positive electrode active material, negative electrode active material, conducting auxiliary, and binder and the types of electrolytic solutions used in the aqueous secondary batteries in Examples 17 to 25 are shown in Table 2 below. Further, the types of methods for preparation of the positive electrode and the negative electrode (Method 1 or 2) are also shown in Table 2. A coin cell was used in Examples 17 to 19 and 25, and a beaker cell was used in Examples 20 to 24.

the voltage in Examples 20, 23, and 24 was 1.25 V, the voltage in Example 21 was 1.35 V, and the voltage in Example 22 was 1.4 V. Charging and discharging were performed at a current for 3 C (based on the theoretical capacity of the positive electrode). With respect to the secondary battery in Example 25, the results of charging and discharging performed under conditions at three voltages (1.6 V, 1.65 V, and 1.7 V) and five currents (5 C, 3 C, 2 C, 1 C, and 0.5 C; based on the theoretical capacity of the negative electrode) are shown in FIG. 15.

INDUSTRIAL APPLICABILITY

The aqueous secondary battery of the present invention has less resource and cost issues. As it uses no organic

TABLE 2

| | Positive electrode | | | | Negative electrode | | | | | | |
|---|---|---|---|---|---|---|---|---|---|---|---|
| Aqueous secondary battery | Type of active material | Compositional ratio for electrode Active material/ Activated carbon/KB/PTFE | Weight of electrode (mg) | Thickness of electrode (μm) | Type of active material | Compositional ratio for electrode Active material/ Activated carbon/KB/PTFE | Weight of electrode (mg) | Thickness of electrode (μm) | Electrolytic solution/ Electrode sheet (%) | Type of electrolytic solution | Preparation method |
| Example 17 | 1-1 | 2/5/0.78/0.78 | 17 | 468 | 1-3 | 2/5/0.78/0.78 | 21 | 529 | — | 3M-NaCl | 1 |
| Example 18 | 1-1 | 2/5/0.78/0.78 | 16 | 461 | 1-3 | 2/5/0.78/0.78 | 21 | 535 | — | 3M-NaCl | 1 |
| Example 19 | 1-1 | 2/5/0.78/0.78 | 16 | 467 | 1-3 | 2/5/0.78/0.78 | 21 | 542 | — | 3M-NaCl | 1 |
| Example 20 | 1-7 | 2/5/0.78/0.78 | 40 | 442 | 1-3 | 1.5/5/0.72/0.72 | 24 | 241 | 22 | 3M-NaCl | 2 |
| Example 21 | 1-7 | 2/5/0.78/0.78 | 40 | 479 | 1-3 | 1.5/5/0.72/0.72 | 22 | 223 | 22 | 3M-NaCl | 2 |
| Example 22 | 1-7 | 2/5/0.78/0.78 | 42 | 467 | 1-3 | 1.5/5/0.72/0.72 | 23 | 246 | 22 | 3M-NaCl | 2 |
| Example 23 | 1-7 | 2/5/0.78/0.78 | 43 | 463 | 1-3 | 1.5/5/0.72/0.72 | 27 | 294 | 38 | 3M-NaCl | 2 |
| Example 24 | 1-7 | 2/5/0.78/0.78 | 50 | 400 | 1-3 | 1.5/5/0.72/0.72 | 22 | 233 | 22 | 3M-NaCl | 2 |
| Example 25 | 1-1 | 2/5/0.78/0.78 | 21 | 494 | 1-3 | 2/5/0.78/0.78 | 21 | 538 | — | 3M-NaCl | 1 |

The types (designations) for the active materials shown in Table 2 are the same as the types (designations) for the active materials shown in Table 1. Activated carbon and KB were used as a conducting auxiliary, and PTFE (polytetrafluoroethylene) was used as a binder.

(Evaluation of Charge/Discharge Cycle Characteristics)

Figure 13:
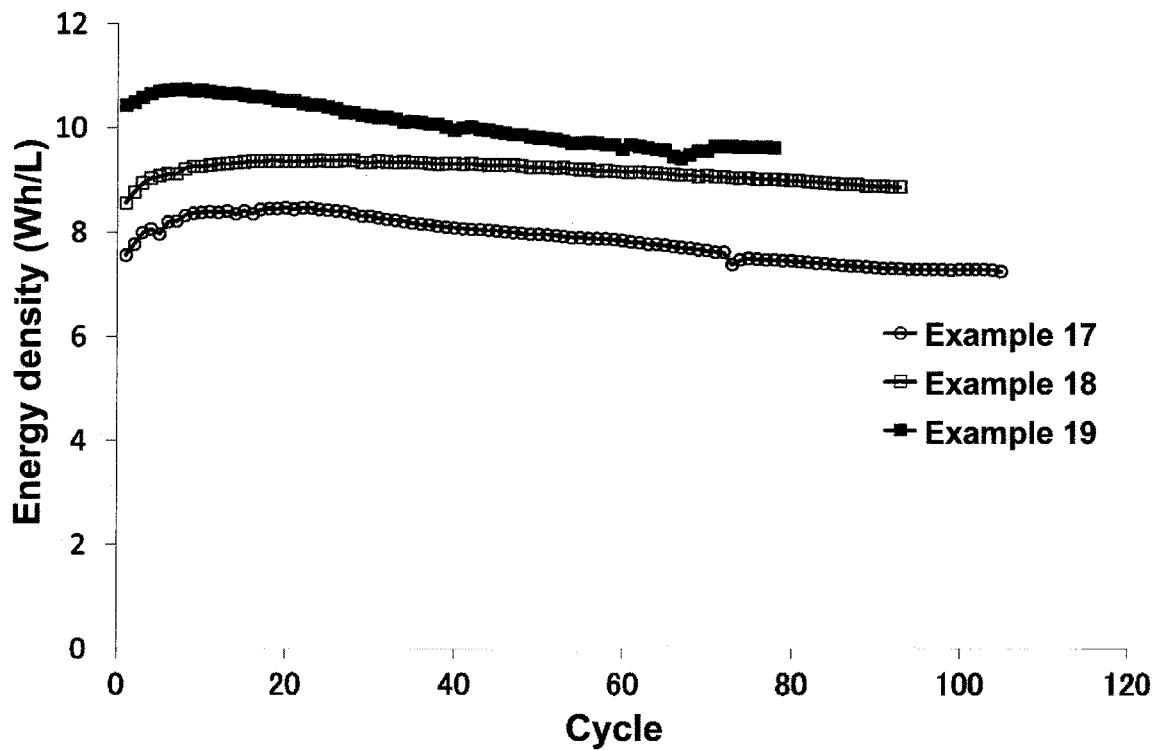
FIG. 13 A diagram showing the cycle characteristics of the aqueous secondary batteries in Examples 17 to 19.
Figure 14:
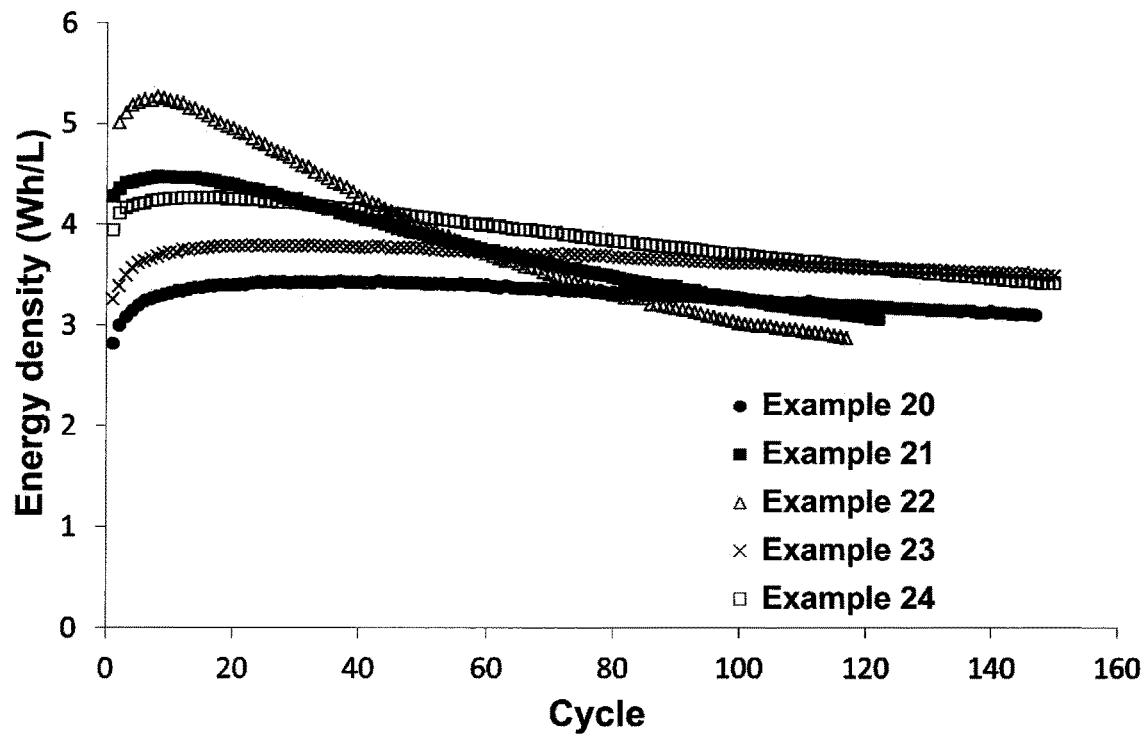
FIG. 14 A diagram showing the cycle characteristics of the aqueous secondary batteries in Examples 20 to 24.

The aqueous secondary batteries obtained in Examples 17 to 24 were subjected to charge/discharge tests. In Examples 17 to 19 and 25, the completed electrode sheet was immersed in a 3 M NaCl solution, which was placed in a desiccator in which the electrode sheet was impregnated with the 3 M NaCl solution under vacuum, and the resultant electrode sheet was used. In Examples 20 to 24, to activated carbon and KB supporting an active material, an electrolytic solution was added, then PTFE was added after kneading. Following more kneading, an electrode sheet was made by forming the resultant mixture into a sheet using a roller press. The cycle characteristics of the aqueous secondary batteries in Examples 17 to 19 are shown in FIG. 13, and the cycle characteristics of the aqueous secondary batteries in Examples 20 to 24 are shown in FIG. 14. In FIG. 13, the charge/discharge voltages in Examples 17, 18, and 19 are 1.6 V, 1.65 V, and 1.7 V, respectively, and charging and discharging were performed at a current for 1 C (based on the theoretical capacity of the negative electrode). In FIG. 14, solvents or has a reduced amount of organic solvents contained in the aqueous electrolytic solution, it is remarkably safer and has high output and excellent cycle characteristics. Hence, it is advantageously used in, for example, a power source for various types of mobile electronic devices and transportation devices or an uninterruptible power supply apparatus.

DESCRIPTION OF THE REFERENCE NUMERALS

10: Aqueous secondary battery
11: Positive electrode current collector
12: Positive electrode active material layer
13: Positive electrode sheet
14: Negative electrode current collector
17: Negative electrode active material layer
18: Negative electrode sheet
19: Separator
20: Aqueous electrolytic solution
22: Cylindrical casing
24: Positive electrode terminal
26: Negative electrode terminal
30: Ring washer
31: Spacer
32: Positive electrode active material layer 33: Negative electrode active material layer
34: Separator
35: Current collector on the positive electrode side
36: Gasket
37: Current collector on the negative electrode side
38: Negative electrode casing
39: Positive electrode casing
40: Aqueous secondary battery

The invention claimed is:

1. An aqueous secondary battery, wherein a negative electrode comprises a compound (I) having a naphthalenediimide structure or a perylenediimide structure as an active material, wherein the compound (I) is a compound represented by the following formula (1) or (2), or a polymer having structural units represented by the following formula (3) or (4):

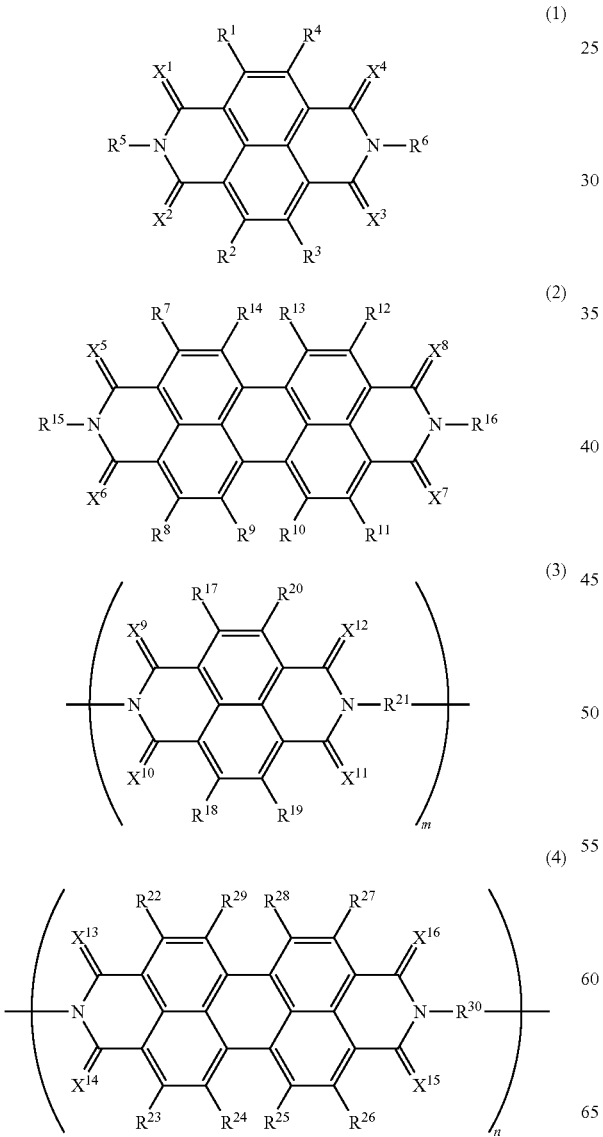

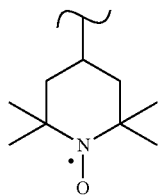

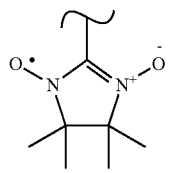

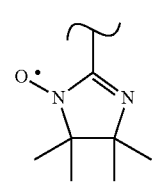

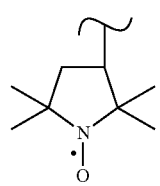

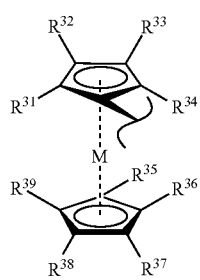

wherein, in formulae (1) to (4), each of $R^1$ to $R^4$, $R^7$ to $R^{14}$, $R^{17}$ to $R^{20}$, and $R^{22}$ to $R^{29}$ is independently a hydrogen atom, a halogen atom, a hydroxyl group, an alkoxy group, or a hydrocarbon group;

each of $R^5$, $R^6$, $R^{15}$, and $R^{16}$ is independently a hydrogen atom, a hydroxyl group, an alkoxy group, a hydrocarbon group, or any one of groups represented by formulae (5) to (9), each of $R^{31}$ to $R^{39}$ is independently a hydrogen atom or a halogen atom, and M is a transition metal;

$R^{21}$ and $R^{30}$ are a single bond, an alkylene group, a carbonyl group, an ester group, a nitrogen-containing group, an aromatic group, a heterocyclic group, a phenylene group, an oxygen-containing hydrocarbon chain, or a nitrogen-containing hydrocarbon chain;

each of $X^1$ to $X^{16}$ is independently an oxygen atom, a sulfur atom, or an organic group, the groups indicated by $R^1$ to $R^{39}$ and $X^1$ to $X^{16}$ are individually optionally substituted with a substituent; and m and n are integers of 2 or more, and wherein a positive electrode comprises at least one compound selected from the group consisting of compounds represented by the following formulae (10) to (16) as an active material:

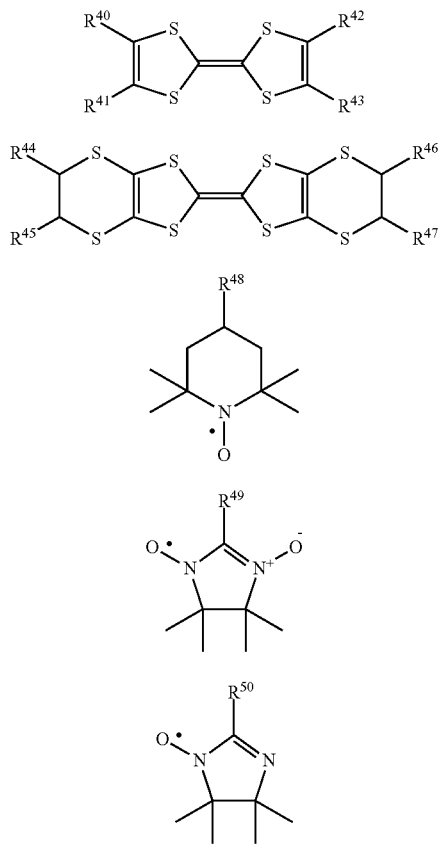

(10)
(11)
(12)
(13)
(14)

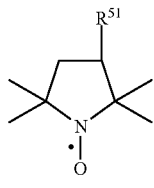

(15)

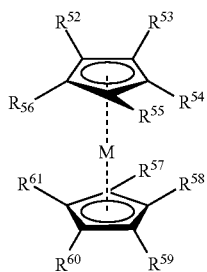

(16)

wherein each of $R^{40}$ to $R^{61}$ is independently a hydrogen atom, a halogen atom, an aromatic group, a heterocyclic group, a carboxyl group, an amino group, a nitro group, a formyl group, a cyano group, a hydroxyl group, an alkoxy group, a thiol group, an alkylthio group, or a hydrocarbon group, M is a transition metal, and the groups indicated by $R^{40}$ to $R^{61}$ are individually optionally substituted with a substituent.

2. The aqueous secondary battery according to claim 1, which comprises an aqueous electrolytic solution containing at least one type of salt selected from the group consisting of an alkali metal salt and an alkaline earth metal salt.

3. The aqueous secondary battery according to claim 2, wherein the aqueous electrolytic solution contains a sodium salt.

4. The aqueous secondary battery according to claim 1, which comprises a conducting auxiliary, a current collector, and a binder.

* * * * *